United States Patent
Link et al.

(10) Patent No.: US 12,254,617 B2
(45) Date of Patent: ***Mar. 18, 2025

(54) AUTOMATED IN-LINE OBJECT INSPECTION

(71) Applicant: KODAK ALARIS INC., Rochester, NY (US)

(72) Inventors: Bruce A. Link, Rochester, NY (US); Robert W. Johnson, Rochester, NY (US); Alexander C. Loui, Rochester, NY (US); Jose Zvietcovich Zegarra, Rochester, NY (US); Erik Garcell, Rochester, NY (US)

(73) Assignee: KODAK ALARIS LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,755

(22) Filed: Jun. 1, 2021

(65) Prior Publication Data

US 2021/0295492 A1 Sep. 23, 2021

Related U.S. Application Data

(63) Continuation of application No. 16/033,858, filed on Jul. 12, 2018, now Pat. No. 11,049,236.
(Continued)

(51) Int. Cl.
*G06T 3/02* (2024.01)
*G01N 21/88* (2006.01)
(Continued)

(52) U.S. Cl.
CPC .......... *G06T 7/001* (2013.01); *G01N 21/8851* (2013.01); *G06T 3/02* (2024.01);
(Continued)

(58) Field of Classification Search
CPC ....... G06T 7/001; G06T 3/0006; G06T 7/344; G06T 7/75; G06T 2207/10028;
(Continued)

(56) References Cited

U.S. PATENT DOCUMENTS 4,328,467 A * 5/1982 van den Brink ........ H01S 3/041
372/98
9,043,069 B1 5/2015 Ferguson
(Continued)

FOREIGN PATENT DOCUMENTS

CN 101927391 12/2010
CN 101927391 A * 12/2010
(Continued)

OTHER PUBLICATIONS

Non-Final Rejection issued in U.S. Appl. No. 16/033,858, dated May 18, 2020.
(Continued)

*Primary Examiner* — Stephen P Coleman
(74) *Attorney, Agent, or Firm* — HOGAN LOVELLS US LLP

(57) ABSTRACT

A system and method for performing real-time quality inspection of objects is disclosed. The system and method include a transport to move objects being inspected, allowing the inspection to be performed in-line. At least one optical acquisition unit is provided that captured optical images of the objects being inspected. The captured optical images are matched to CAD models of objects, and the matched CAD model is extracted. A laser with an illumination light beam has a wavelength in the violet or ultraviolet range then conducts scans of the objects, which are formed into three-dimensional point clouds. The point clouds are compared to the extracted CAD models for each object, where CTF are compared to user input or CAD model
(Continued)

information and the object is determined to be acceptable or defective based on the extent of deviation between the point cloud and the CAD model.

7 Claims, 16 Drawing Sheets

Related U.S. Application Data

(60) Provisional application No. 62/587,806, filed on Nov. 17, 2017.

(51) Int. Cl.
    *G06T 7/00*         (2017.01)
    *G06T 7/33*         (2017.01)
    *G06T 7/73*         (2017.01)

(52) U.S. Cl.
    CPC ............... *G06T 7/344* (2017.01); *G06T 7/75* (2017.01); *G01N 2021/8887* (2013.01); *G06T 2207/10028* (2013.01); *G06T 2207/20021* (2013.01)

(58) Field of Classification Search
    CPC ...... G06T 2207/20021; G01N 21/8851; G01N 2021/8887; G06V 10/751
    USPC .......................................................... 382/141
    See application file for complete search history.

(56) References Cited

U.S. PATENT DOCUMENTS

| | | | |
|---|---|---|---|
| 10,284,794 | B1 | 5/2019 | Francois |
| 2002/0018216 | A1 | 2/2002 | Kawasaki |
| 2004/0066908 | A1 | 4/2004 | Hanke |
| 2004/0254758 | A1* | 12/2004 | Chang ............... G06T 17/00 702/155 |
| 2005/0148859 | A1 | 7/2005 | Miga |
| 2009/0088999 | A1* | 4/2009 | Bryll ................ G01B 21/045 382/141 |
| 2009/0245616 | A1* | 10/2009 | De La Ballina ......... A21C 9/08 382/141 |
| 2010/0091300 | A1 | 4/2010 | Thomaschewski |
| 2010/0316280 | A1 | 12/2010 | Lancaster |
| 2012/0220851 | A1 | 8/2012 | Razansky |
| 2013/0121564 | A1 | 5/2013 | Kitamura |
| 2015/0002598 | A1* | 1/2015 | Furuta ............. G03G 15/04072 347/133 |
| 2015/0054946 | A1* | 2/2015 | Zhang .................. G06V 20/10 348/136 |
| 2015/0221130 | A1 | 8/2015 | Georgescu |
| 2016/0300003 | A1 | 10/2016 | Knoll |
| 2016/0339652 | A1* | 11/2016 | Safai .................... B29C 73/12 |
| 2017/0084085 | A1 | 3/2017 | Solorio |
| 2017/0193278 | A1 | 7/2017 | Mazula |
| 2017/0280114 | A1* | 9/2017 | Samuelson ........... G06T 3/0068 |
| 2017/0307736 | A1* | 10/2017 | Donovan ............. G01S 7/4815 |
| 2018/0021885 | A1 | 1/2018 | O'Connor |
| 2018/0112426 | A1 | 4/2018 | Cooper |
| 2018/0149471 | A1 | 5/2018 | Lu |
| 2018/0150701 | A1 | 5/2018 | Kang |
| 2018/0374239 | A1 | 12/2018 | Wallack |
| 2019/0188872 | A1 | 6/2019 | Aflalo |

FOREIGN PATENT DOCUMENTS

| | | |
|---|---|---|
| CN | 105844057 | 8/2016 |
| CN | 108303037 | 7/2018 |
| CN | 108458659 | 8/2018 |
| CN | 109682320 | 4/2019 |
| JP | 2014145735 | 8/2014 |
| WO | 2012/061945 | 5/2012 |
| WO | 2016/146703 | 9/2016 |

OTHER PUBLICATIONS

Notice of Allowance issued in U.S. Appl. No. 16/033,858, dated Oct. 21, 2020.
Notice of Allowance issued in U.S. Appl. No. 16/033,858, dated Feb. 12, 2021.
Non-Final Rejection issued in U.S. Appl. No. 16/401,890, dated May 14, 2020.
Notice of Allowance issued in U.S. Appl. No. 16/401,890, dated Feb. 9, 2021.
Non-Final Rejection issued in U.S. Appl. No. 16/923,629, dated Aug. 6, 2020.
Final Rejection issued in U.S. Appl. No. 16/923,629, dated Nov. 27, 2020.
Notice of Allowance issued in U.S. Appl. No. 16/923,629, dated Apr. 2, 2021.
Requirement for Restriction/Election issued in U.S. Appl. No. 17/335,882, dated Mar. 14, 2023.
Non-Final Rejection issued in U.S. Appl. No. 17/335,882, dated Aug. 7, 2023.
Notice of Allowance issued in U.S. Appl. No. 17/335,882, dated Dec. 13, 2023.
International Preliminary Report on Patentability mailed Nov. 2, 2021 in PCT/US2020/030940.
International Preliminary Report on Patentability mailed May 19, 2020 in International Application No. PCT/US2018/057732.
Bosche, "Automated recognition of 3D CAD model objects in laser scans and calculation of as-built dimensions for dimensional compliance control in construction," Advanced Engineering Informatics, 24 (2010), pp. 107-118.
Kim et al., "Estimating Head Pose with an RGBD Sensor: A Comparison of Appearance-Based and Pose-Based Local Subspace Methods," 2013 IEEE International Conference on Image Processing, Sep. 15, 2013 pp. 3637-3641.
Changmin Kim et al: "Fully Automated Registration of 3D CAD Model with Point Cloud from Construction Site", Proceedings of the 20th International Symposium on Automation and Robotics in Construction ISARC 2003—The Future Site, Jun. 29, 2011 (Jun. 29, 2011), XP55573701, ISSN: 2413-5844, DOI: 10.22260/ISARC2011/0169 ISBN: 978-90-68-14574-8, the whole document.
Rehder Joern et al: "Spatio-temporal laser to visual/inertial calibration with applications to hand-held, large scale scanning", 2014 IEEE/RSJ International Conference on Intelligent Robots and Systems, IEEE, Sep. 14, 2014 (Sep. 14, 2014), pp. 459-465, XP032676482, DOI: 10.1109/IROS.2014.6942599 [retrieved on Oct. 31, 2014] section III Methodology, B. Calibration; p. 460-p. 462; figure 2.
Li Xiaojie et al: "Auto Calibration of a Laser 3D Color Digitization System", 2009, 12th European Conference on Computer Vision, ECCV 2012; [Lecture Notes in Computer Science], pp. 691-699, XP047541824, ISSN: 0302-9743 ISBN: 978-3-642-04427-4 the whole document.
Delacalle F J et al: "Generation of differential topographic images for surface inspection of long products", Journal of Real-Time Image Processing, Springer, DE, vol. 17, No. 4, Jan. 11, 2019 (Jan. 11, 2019), pp. 967-980, XP037187059, ISSN: 1861-8200, DOI: 10.1007/S11554-018-0844-2 [retrieved on Jan. 11, 2019] the whole document.
He Wantao et al: "A robust and accurate automated registration method for turbine blade precision metrology", The International Journal of Advanced Manufacturing Technology, Springer, London, vol. 97, No. 9, May 29, 2018 (May 29, 2018), pp. 3711-3721, XP036549942, ISSN: 0268-3768, DOI: 10.1007/S00170-018-2173-9 [retrieved on May 29, 2018] the whole document.
Communication pursuant to Article 94(3) EPC issued in EP Patent Application No. 18 801 177.9, dated Sep. 20, 2021.
Notification of the First Office Action issued in CN Patent Application No. 201880074234.7, dated Dec. 10, 2023.
Communication pursuant to Article 94(3) EPC issued in EP Patent Application No. 20 727 498.6, dated Aug. 1, 2023.
Communication pursuant to Article 94(3) EPC issued in EP Patent Application No. 18 801 177.9, dated Jan. 31, 2024.

(56) References Cited

OTHER PUBLICATIONS

Notification of the First Office Action issued in CN Patent Application No. 202080048597.0, dated Aug. 28, 2024.

* cited by examiner

AUTOMATED IN-LINE OBJECT INSPECTION

CROSS-REFERENCE TO RELATED APPLICATIONS

This application is a continuation of U.S. application Ser. No. 16/033,858, filed Jul. 12, 2018, which claims priority to U.S. Provisional Application No. 62/587,806, filed on Nov. 17, 2017, the contents of which are incorporated herein by reference.

FIELD OF THE INVENTION

This invention relates to automated inspection of physical objects, and in particular to an inspection system and method implementing non-contact, three-dimensional scanning of physical objects.

BACKGROUND OF THE INVENTION

In many manufacturing processes, it is important that all the parts are formed within tolerances defined by industry standards, company standards, or required specifications. For example, in the manufacturing of parts by injection molding, additive manufacturing, or machining, it is important that each manufactured part meet certain standards and specifications. In modern production, parts, tools, dies, and molds are usually designed based on computer-assisted design (CAD) models. In computer-aided manufacturing (CAM), for example, computer numerically-controlled (CNC) machine tools use the CAD design as an input to control the operation of the tool in machining a product.

There are several systems and methods known in the art for verifying the surface shape of manufactured parts and products. For example, coordinate measuring machines (CMMs), laser trackers, and three-dimensional scanning measurement systems, and other equipment is used to perform precise inspections. However, these inspection systems require a long and complicated set-up and further require particular positioning of the parts or products to be inspected within the inspection system before inspection can begin. For example, in CMMs, the parts are required to be positioned within a jig to hold the part properly. Thus, a significant amount of time is invested in simply setting up the products or parts and the inspection system, and the set-up process needs to be completed separately for each different part to be inspected. Thus, high volume manufacturers are only capable of inspecting a small sampling of parts or products while still maintaining high production volume, leading to problems such as defective parts reaching customers and resulting in losses of revenue, dealing with returned parts, and loss of customer trust. Additionally, due to the complexity of using current inspection systems, many manufacturers rely on manual inspection for at least a portion of their products and parts, which adds significant costs.

What is needed is an easy to use, in-line inspection system that reduces costs and increases turn-around time and manufacturing volume. Further, what is needed is an in-line inspection system that can inspect parts and products regardless of orientation and that does not require that the parts or products being inspected are first put into any jig or other mechanism to hold them during inspection.

SUMMARY OF THE INVENTION

The present invention is directed to an in-line system and method for quality inspection of manufactured parts and products, including first article inspection, critical to function parameters (CTF) and defect detection. The system and method perform non-contact quality inspection by scanning the three-dimensional (3-D) surface geometry of an object being inspected and comparing information from the scanning process to 3-D models of the object. The objects may be solid, opaque, translucent, or transparent, and may have specular or diffusive surface features. Objects may include a combination of these features, and still be inspected with the system and method of the present invention.

The system and method may include an optical scanning system and a laser module, including a laser profilometer, for performing precise in-line inspection of objects. In certain implementations, the light beam of the laser profilometer may have a wavelength in the violet or ultraviolet range, although other wavelengths may also be used. When objects, such as parts or products, are being inspected, they may be placed on a transport system, such as a transport belt, that moves them past the optical scanning system and laser profilometer. As the objects move along the transport belt, they pass under the optical scanning system, which scans the objects and identifies the positioning and orientation of the objects on the transport belt. The system and method may inspect multiple objects placed on the transport at the same time, with the transport moving the objects past the inspection system components in an in-line process. The inspected objects could be the same or different part or products, with the optical scanning system recognizing each object as it passes. In addition, the optical scanner system may identify contamination such as dust, oil, or other foreign objects present on the object, and may also detect and measure objects for accuracy of the expected color, texture or finish of the objects. A computer processor in the quality inspection system receives the determined identity of the objects being inspection from the optical scanning system, and loads a data file corresponding to the identified product. The data file may be a CAD model, which is then converted into a uniform point cloud representing the object.

Following the optical scanning system, a laser module including a laser profilometer, for example with an illumination light beam having a wavelength in the violet or ultraviolet range, is provided in the scanning system which is used to scan the objects being inspected. The laser system outputs a regularly spaced three-dimensional (3-D) coordinate point cloud representing the object or objects. The system and method then compares this obtained 3-D coordinate point cloud representing the objects with the uniform point cloud retrieved from the computer processor. Differences between the two are determined, and are used to determine the extent of variations between the object being inspected and the expected product (based on the stored data file). The system and method may then identify parts or sections of the object being inspected as potentially being defective, and may alert a system operator when defective objects are identified.

In particular, the system may be used to inspect parts manufactured from a mold. The mold would have the desired dimensions of the final part, and it is expected that parts produced by the mold would have these desired dimensions within a certain tolerance level. Determining defect data in real time from injected molded parts can be used as a predictive measuring method to determine when significant wear has occurred and the mold needs to be replaced before defects becomes objectionable. Thus, the system may be used as part of a geometric dimensioning and tolerancing quality inspection process. Dimensioning specifications define the nominal, as-modeled or as-intended geometry. Tolerancing specifications define the allowable variation for the form and possibly the size of individual features, and the allowable variation in orientation and location between features.

DETAILED DESCRIPTION OF THE INVENTION

The present invention is directed to a system and method for high precision quality control inspection of objects. The system is configured to perform geometric inspection of manufactured parts for quality control and inspection (including first article inspection, critical to function parameters (CTF), and defect detection). The system may be used in-line within a manufacturing line to assess parts between machining tools, and end of line to assess finished parts as they come off the machine, or offline by physically placing parts to be inspected on the transport. In particular, the system performs scanning of the three-dimensional (3-D) surface geometry of an object such as manufactured components, parts, and products to detect defects. The system performs automated, in-line or offline quality inspection by scanning objects with both an optical acquisition unit and a laser module system, and making comparison between the data from the object scans and predetermined data files accessible by a system processor, the data files corresponding to the objects being inspected.

To perform the quality inspection, the system includes a moving transport, such as a belt or rollers, to transport objects along an inspection path, an optical system to image objects at the beginning of the transport path, and a laser module measurement system, such as a violet or ultraviolet range wavelength laser profilometer, to record 3-D object geometry located after the optical system on the transport path. The laser profilometer may capture 3-D object geometry in the form of an unstructured point cloud. The system also includes a computer processor for computation and storage of data, including stored object data information such as CAD data that shows the expected dimensions of the objects being inspected. An operator control panel and display may be provided to allow an operator to view CAD images from the storage database, view laser captured 3-D images of the objects being inspected, and view heat map and histogram information detailing differences between the CAD images from the stored database as compared to the actual imaged objects. The operator control panel may further allow the operator to modify parameters of the inspection system, control operation of or pause the inspection system, and review defect information regarding the inspected objects.

Figure 1:
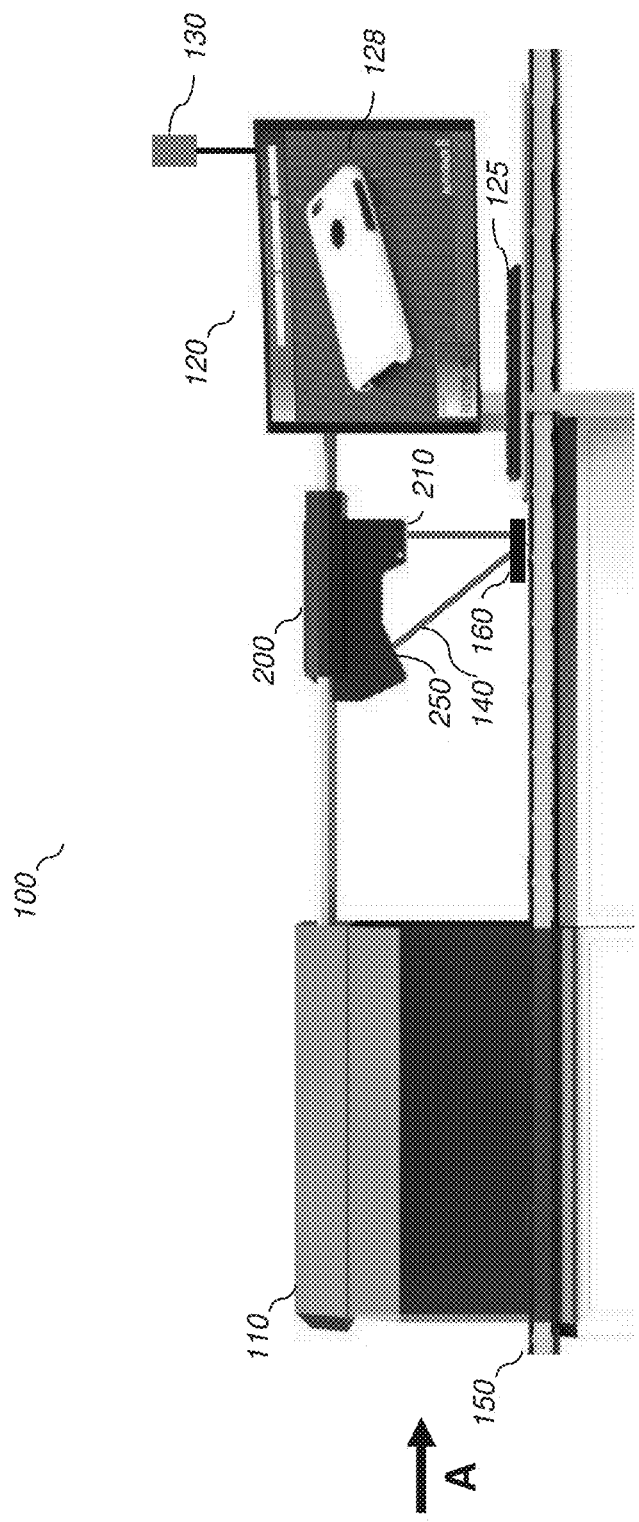
FIG. 1 is a high-level diagram showing the components of the quality inspection system.

As shown in FIG. 1, the quality inspection system 100 includes an optical acquisition unit 110 at one end of a transport 150, which moves objects 160 to be inspected through the inspection system. The transport 150 may be, for example, a conveyer belt or system of rollers, and moves the objects being inspected along the transport path in direction A. The optical acquisition unit 110 may be an area or linear array optical system, including one or more image capturing units. The optical acquisition unit 110 may be connected to a processing device configured to analyze captured images of the objects on the transport 150 in order to identify the object, as well as its position and orientation on the transport. A laser module 200 is included along the transport path, after the optical acquisition unit 110. The laser module includes a laser driver 210, and laser sensor 250. The laser module emits a laser beam 140, which is reflected from the object being inspected 160 and then sensed by the laser sensor 250. The laser module 200 may be, but is not limited to, a laser profilometer with an illumination light beam having a wavelength in the violet or ultraviolet range, used to scan the object and output a three-dimensional (3-D) unstructured point cloud. The laser profilometer may use, but is not limited to, laser triangulation or time of flight displacement sensing to measure depth. The system may also include an operator control panel 120, allowing a system operator to perform inspection of objects, modify inspection parameters, review object inspection results, and respond to defect or alert notifications. The operator control panel may include a user input 125, such as a keyboard, mouse, or touchscreen, and may further include a display 128. An alert notification 130 may be included in the quality inspection system, and may be a visual or audible alert. The user loads the inspection system 100 with the appropriate CAD models and tolerance data for the object or objects to be inspected. Objects that exceed a predetermined tolerance are identified as defective. The user can view the defective three-dimensional (3-D) coordinate point cloud variations from the CAD model through a heat-map displayed on the user display 128 or define actions that should occur for the defective object.

Figure 2:
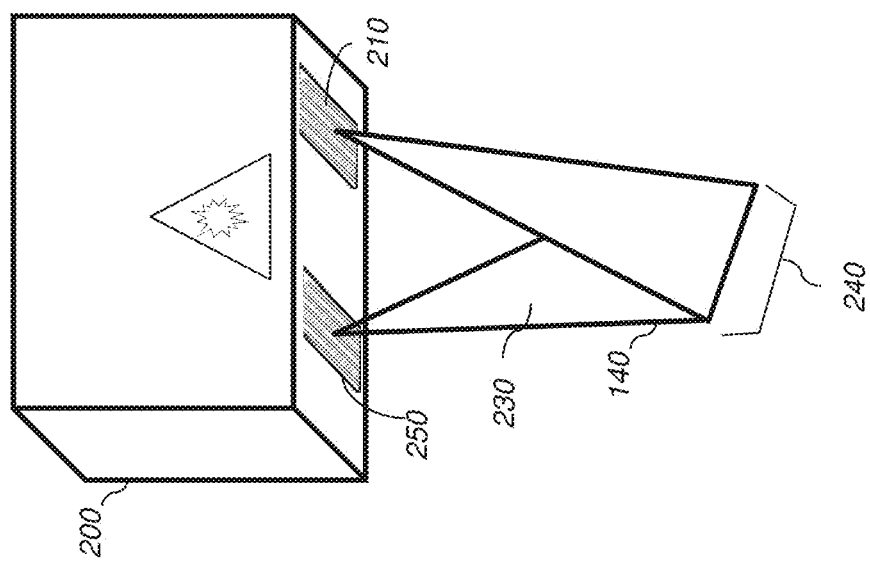
FIG. 2 is an illustration of the components of the laser system in the quality inspection system.

As shown in FIG. 2, which is an illustration of the components of the laser module 200, the laser module 200 includes a laser driver 210 that outputs a laser beam 140 having a conical shape. The laser beam 140 forms a line on the transport 150 that corresponds to the field of view 240. The length of the line formed is related to width of the laser cone 230 of the laser beam 140 and the distance between the laser driver 210 and the object being inspected 160. The laser beam 140 is reflected from the object 160 being inspected back to a laser sensor 250 on the laser module 200. In an alternative embodiment, the laser driver 210 could output a laser beam where a laser beam 140 is a point that hits the object and is reflected off the object.

The laser module 200 may be a laser profilometer. In particular, a laser profilometer with Blue-violet laser uses 405-nm wavelength may be used due to its shorter wavelength. A laser module with an illumination light beam with a wavelength in the violet or ultraviolet range is superior to standard sensors that use, for example, red laser diode on metals and organic materials. In addition, compared to a laser module using longer wavelengths in the red region, the shorter wavelength is less susceptible to objects that are self-illuminated due to thermal characteristics. The violet or ultraviolet wavelength minimizes the spread of laser light on the surface of the object 160 being inspected and does not penetrate the object thereby producing more precise measuring results allowing the detection and measurement of a broad range of objects made from plastics, metals, glass, and other material regardless of the features surface finishes.

Figure 3A:
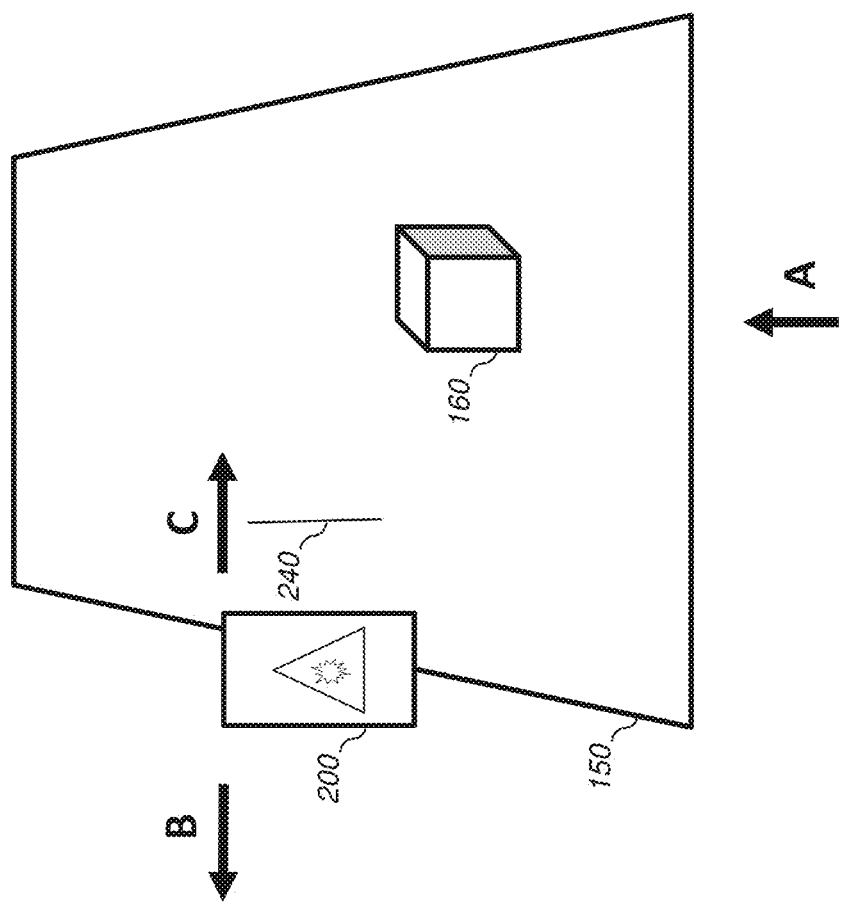
FIGS. 3A and 3B are illustrations of the product inspection system in use, showing motion of the transport and laser module during inspection.
Figure 3B:
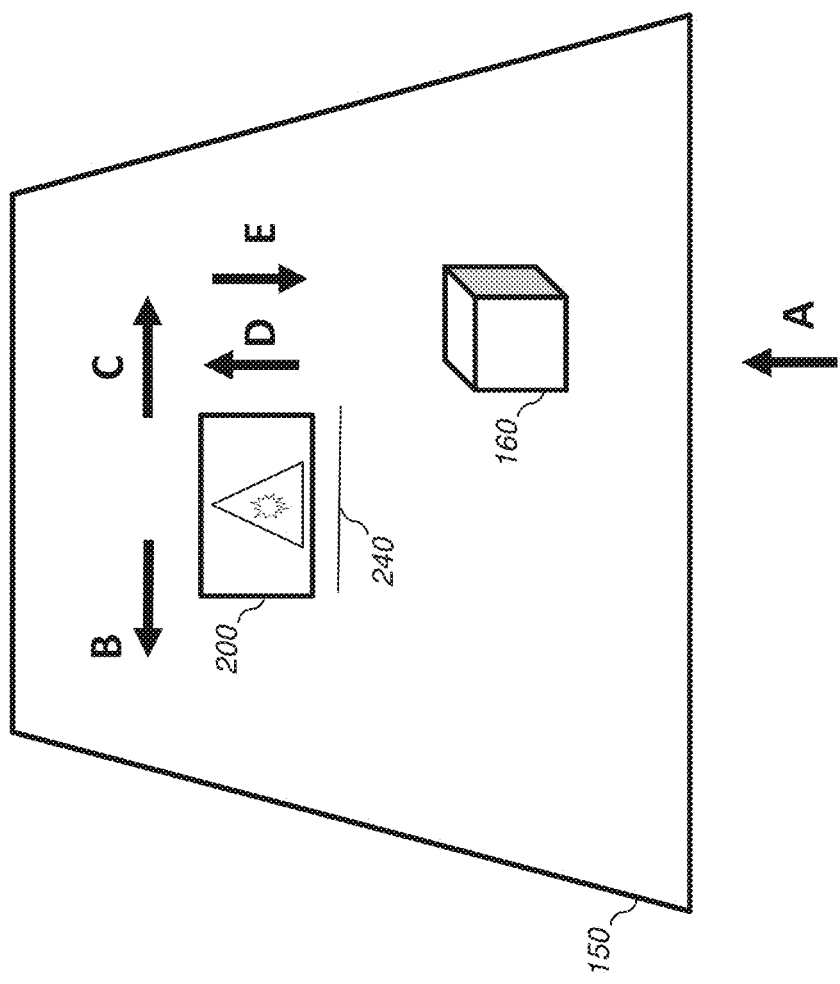

FIGS. 3A and 3B illustrate system configurations for performing the product quality inspection. As shown in FIG. 3A, according to one embodiment the inspection system may include a transport 150 that moves the objects 160 being inspected in direction A. The laser module 200 may be included on guides that allow it to move perpendicular to the transport direction, for example moving in directions B and C as shown in FIG. 3A. As the laser module moves perpendicular to the direction of the transport, the laser field of view 240 it makes multiple passes over the object being inspected. Recall the laser beam 140 forms a line on the transport 150 that corresponds to the field of view 240 which is parallel to the direction of the transport 150 as shown by direction A. During each pass, the laser module's field of view makes multiple scans of the object. Overlapping scanning (i.e. raster scanning) of the object may be used, which results in reduced noise inherent in translation of both the object 160 on transport 150 and laser module 200, and which increases the sampling resolution. Having multiple data per point on the point cloud allows for reduction in the total scan error by minimizing data variance. In the configuration shown in FIG. 3A, the laser module 200 may be rotated 90 degrees so that the laser field of view 240 is parallel to the directions B and C. In this case the laser module 200 captures a scan of the object equal to the width of the laser field of view 240. The laser module 200 continues moving across the transport 150 in direction B or C. When the laser module 200 travels a distance equal to the laser field of view 240, the laser module 200 captures another scan. In the alternative configuration shown in FIG. 3B, the laser module 200 may be positioned on guides that allow it to move parallel to the transport 150. The laser may module may move back and forth above the object being inspected, with the reflected laser cone passing repeatedly over the object. In FIG. 3B, the laser module 200 orientation is rotated 90 from FIG. 3 such that the laser field of view 240 is perpendicular to the transport 150. The laser module 200 moves in direction D scanning a predefined area. When the laser module 200 reaches the end of the predefined area, the laser module 200 travels in the direction C by a distance equal to the width of the laser FOV 240 before starting to another scan in the direction E. The laser module continues scanning in directions D and E as the laser module 200 moves in direction C. Once the laser module 200 scans the width of the transport, it repeats the process of scanning in directions D and E as the laser module moves in direction B.

During an inspection process, as an object is moved along the transport it is first imaged by the optical acquisition unit 110. As noted above, the captured images of the object are used to both identify the object and to determine its position and orientation within the quality inspection system. The determined coordinate position and orientation of the object 160 on transport 150 can be sent to a processing unit connected to the laser scanning profilometer module. This processing unit may control the laser profilometer so that it scans only the area of the transport where the object is located. Alternatively, the profilometer may be configured to scan the entire width of the transport instead of focusing on a particular region where an object is determined to be positioned. When the profilometer scans the entire transport, the point cloud resulting from the scans is cropped for the region of the transport where the objects exists based on where the optical system found the part. When scanning the entire transport width, multiple objects may exist in the same profilometer scan, which can then be separated out during subsequent processing. In addition, the laser profilometer module can locate the part and directly extract the part out from the background.

Once the object being inspected is identified based on the captured images from the optical acquisition unit, a system processing unit 170 loads the CAD data corresponding to the identified object from a CAD model database 425, and converts it to a uniform point cloud. The point cloud from the laser profilometer will be overlaid and registered with the CAD point cloud. The deviation between the CAD point cloud and the point cloud from the laser profilometer is calculated to create a heat map of the differences. By analyzing the CAD model for the object, the point cloud from the laser profilometer and 3-D registered heat map of the difference with the original CAD model, the operator can use the 3-D registered heat map for visualizing any variations of the object from the CAD model. These visualizations of object variations are recorded over time along with object counts, mold cavity positions, material compositions, and other factors relevant to the monitored manufacturing process. The visualizations are presented in a selectable chronological sequence with object illustrations containing with 3-D registered heat maps. Each individual image of the objects is also registered so that an operator can observe a representation of a degradation condition represented by the heat map over a selected period. This form of dynamic visualization can be useful for diagnostic purposes by providing illustrations of wear patterns and for determining in advance when the production of a given object will exceed tolerance by projecting the monitored degradation, preventing the manufacture of defective objects, such as parts or components. To further distinguish between minute variations of the 3-D registered heat maps, visualizations of these variations can be enhanced by using different colors, textures, and or patterns. Calculated and synthesized heat maps projections of the monitored degradations can also be provided for diagnostic purposes.

In addition, a histogram of error can be presented to the operator. The system can be configured to identify and flag parts that exceed predefined tolerance as being defective. The user can configure the system to produce a notification, stop the production or sort the detective part from other parts with the use of a part picker or similar means.

Figure 4:
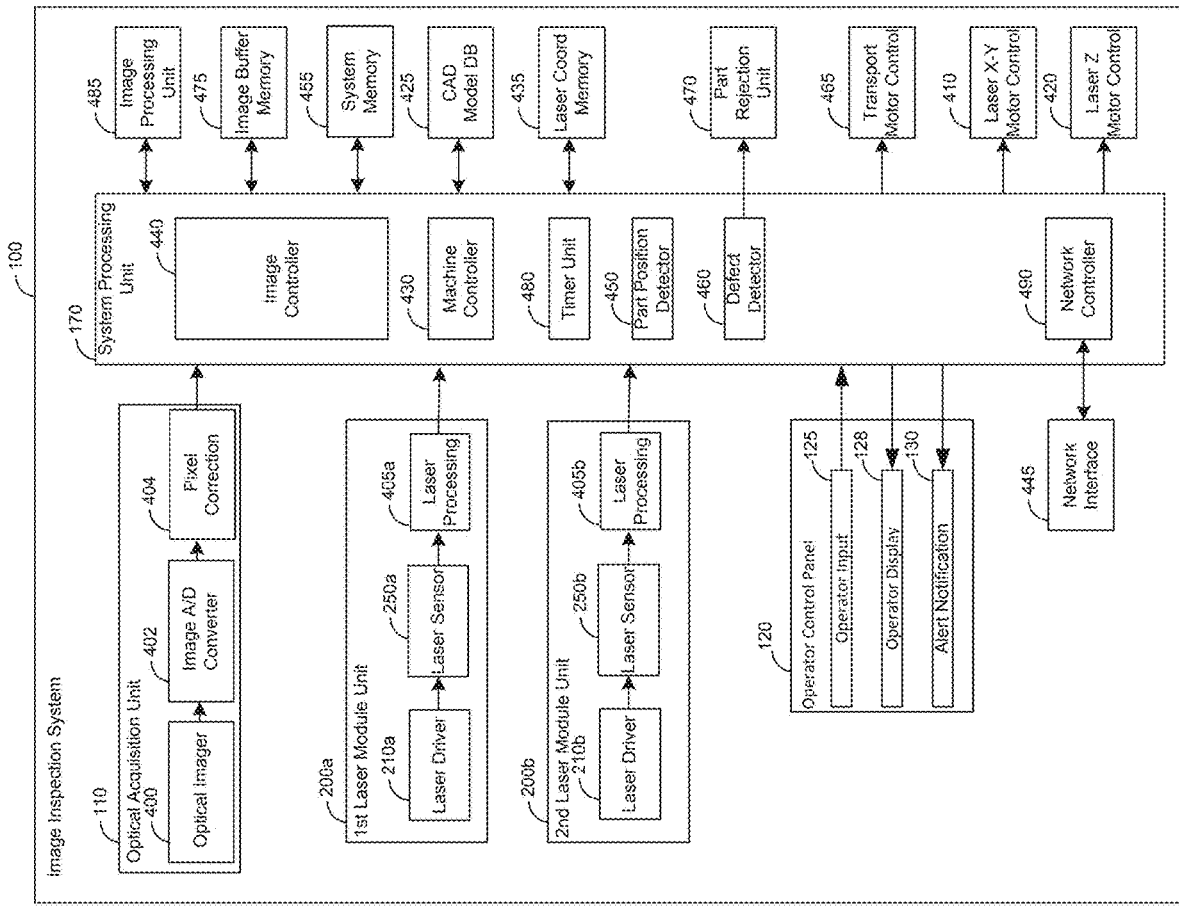
FIG. 4 is a block diagram of the components of the quality inspection system.

FIG. 4 illustrates a block diagram which shows the schematic illustration of the quality inspection system components. As shown in FIG. 4, the inspection system 100 includes an optical acquisition unit 110. The optical accusation unit includes an optical imager 400 to capture images of the objects being inspected, an image A/D converter 402 converts an analog image signal output from the optical imager 400 and generates digital image data which is then output to the pixel correction 404. As noted above, the image device 400 has an image capture element using CMOS (complementary metal oxide semiconductors) which are arranged in a line in the main scan direction which is perpendicular to the transport 150 as shown by arrow A. As noted above, the image capture device could be a CIS (contact image sensor). In addition, it is also possible to utilize an image capturing sensor using CCD's (charge coupled devices) in place of the CIS. The optical acquisition unit 110 could also include a stereo imager. The pixel correction 404 corrects for any pixel or magnification abnormalities. The pixel correction 404 outputs the digital image data to the image controller 440 within the system processing unit 170. The system further includes a first laser module 200a, and optionally a second laser module 200b. Although two laser modules are shown, the system may include any number of laser modules. With more laser modules, the system may be able to capture profiles of larger objects, or capture more profiles of complex object during the inspection process. The use of multiple laser modules further minimizes occlusions or shadows. An occlusion is a blockage of the laser beam 140 traveling from laser driver 210 to object and back to the laser sensor 230. For example, by knowing the object orientation as determined by the optical acquisition unit 110, the laser module 200 mounted within the quality inspection system 100 can be changed manually or dynamically to optimize the viewing angle, field of view, or working distance in order to minimize occlusions or shadows to control the position and motion of the laser module 200 to get the best scans. Each laser module 200a, 200b includes a laser driver 210, a laser sensor 250, and laser processing 405. The laser processing 405 may be a microprocessor or processing circuitry, or may include a communication module to receive processing commands from an external processing device. The laser processing packages and sends the unstructured point cloud representing the measurement data to the image controller 440 which stores the data in the laser coordinate memory 435.

The optical acquisition unit 110 sends the digital image data to the image controller 440. The image processing unit 485 then processes the digital image to identify the object being scanned. Based on the characteristics of the identified object 160, predefined setup parameters or recipes for laser module 200 may be pulled out system memory 455 to optimize the configuration of the laser module 200. The characteristics of the object related to the predefined setup parameters in the system memory 455 may be, for example, reflectivity, color, geometry, or surface finish. Predefined setup parameters or recipes may be laser driver 210 strength, profiles per second, or exposure.

The operator configures the inspection system 100 to perform the required inspection either through the operator control panel 120 or network interface 445. An operator control panel 120 includes an operator input 125, which may be, for example, a mouse, keyboard, touchscreen, or touchpad. An operator display 128 and alert notification 130 may also be included in the operator control panel. The alert notification 130 may be, for example, a Red, Yellow, and Green light stack, audio alarm or other visual alert mechanism. The network interface 445 allows the system to communicate with external processing units and network devices. The network interface may be connected to a local area network, wide area network, or to the internet through wired or wireless connections. The network interface can be of any form known to those skilled in the art including, but not limited to, Ethernet, USB, Wi-Fi, cellular, or other data network interface circuit. The network interface 445 also provides a means to remotely control the inspection system 100 by supplying various types of information required for inspection. The network controller 490 manages the network interface 445 and directs network communications to either the image controller 440 or a machine controller 430.

A system memory 455 may also be connected to the system processing unit 170, as well as other processing components in the inspection system. The system processing unit 170, and other processing units may be, for example, one or more microprocessors, one or more coprocessors, one or more multi-core processors, one or more controllers, processing circuitry, an ASIC (application specific integrated circuit) or FPGA (field programmable gate array), or a combination thereof. The processing units may be configured to execute instructions stored in the system memory 455 or otherwise accessible to the processing circuitry, such as over the communications network through network controller 490. These instructions, when executed by the processing circuitry, may cause the inspection system to perform one or more of the functionalities described herein. The memory 455 may include volatile and/or non-volatile memory, and may be a hard disk, random access memory, read only memory, cache memory, flash memory, an optical disc, or circuitry configured to store information. System memory 455 may be any non-transitory computer readable storage medium, in communication with the system processing units. The memory may be configured to store information, data, applications, or program instructions allowing the system processing unit 170 and other processing units to control the inspection system and perform the inspection process.

The system processing unit 170 includes an image controller 440 configured to receive and analyze images from the optical acquisition unit 110. The received images from the optical acquisition unit 110 are stored in the image buffer memory 475 to hold the processed images. An image processing unit 485 is connected to the system processing unit 170. The image processing unit 485 is configured to receive the captured images, in digital form and after pixel correction, from the optical acquisition unit and perform further processing on the images. These captured images may be stored in an image buffer memory 475, with is connected to the image processing unit 485, the system processing unit 440, or both. The image buffer memory store recently captured images sent by the optical acquisition unit during an inspection process. As part of the processing, the image processing unit 485 may interact with the image controller 440 of the system processing unit 170. The system further includes a CAD model database 425, which stores CAD data profiles for objects being inspected during the quality control inspection process. This CAD model database 425 may include predetermined CAD profiles of objects anticipated to be inspected, and may further be an updatable database allowing a user to manually, or automatically, store additional CAD profiles in the database for new objects being inspected. For example, the CAD model database 425 may be updated by executing a process to upload CAD models stored on a local memory, or to upload CAD models over the network communication interface.

The image controller 440 is also configured to receive and analyze unstructured point cloud measurement data from the laser module unit 200a and 200b. The received unstructured point cloud data from the laser module unit 200 are stored in the laser coordinate memory 435 to hold for further processing by the image processing unit 485.

A machine controller 430 is configured to control the operation of the optical acquisition unit 110 and/or the laser module units 200a, 200b. For example, the machine controller may control the timing of the image capturing, and/or use the image capture data to control the movement of the transport 150 includes transport speed, and the movement and scanning of the laser module units. A timer unit 480 may be included in the system processing unit 170, as well as a part position detector 450 and a defect detector 460. The part position detector may be configured to determine the position and orientation of the objects being detected, including position on the transport and orientation relative to either the direction of transport or another fixed coordinate in the system. The defect detector 460 is configured to determine, based on comparisons between the laser module scans of an object being inspected and stored data files regarding expected dimensions of the object, whether the product is within certain tolerance levels. If the product is not within tolerance levels, the defect detector may issue a defect warning. The defect detector may also be configured to determine defects based on the captured images from the optical acquisition unit 110.

A part rejection unit 470 may be in communication with the defect detector 460 in the system processing unit 170. The part rejection unit 470 may receive information from the defect detector 460, and based on a determination of whether the defects meet predetermined quality threshold requirements, issue a command to stop the inspection process, flag the inspected object as defected. The part rejection unit 470 with and the timer unit 480 will track the defective object and take action to remove the defective object from the transport 150 or alert the operator of a defect condition through, for example, the alert notification 130, or the network interface 445.

The image inspection system further includes controls for controlling the transport 150 and laser modules 200 during the inspection process. Transport motor control 465 may control the speed and timing of the transport mechanism that moves the objects along the inspection transport path. For example, the transport motor control 465 may be connected to a motor driving a conveyor belt or rollers forming transport 150, and may drive the motors at varying speeds to control the speed of the objects being inspected. The transport motor control may also stop the transport 150 when a defective object is detected, allowing an operator time to remove the object from the inspection line or take other appropriate action. Two laser motor controls may be included, with a laser X-Y motor control 410 controlling the movement of the laser module 200 in an X-Y plane, and a laser Z motor control 420 controlling the movement of the laser module units in the Z direction (or height). For example, the laser X-Y motor control 410 may move the laser module units 200 in the X direction to cause the laser to traverse the width of the transport 150 thereby causing the laser field of view 240 to make multiple scans over the object being inspected. The laser Z motor control 420 may move the laser modules up and down so that the system can inspect objects of varying height. This allows the distance between the laser driver 210 and the object being inspected 160 to be maintained.

Figure 5:
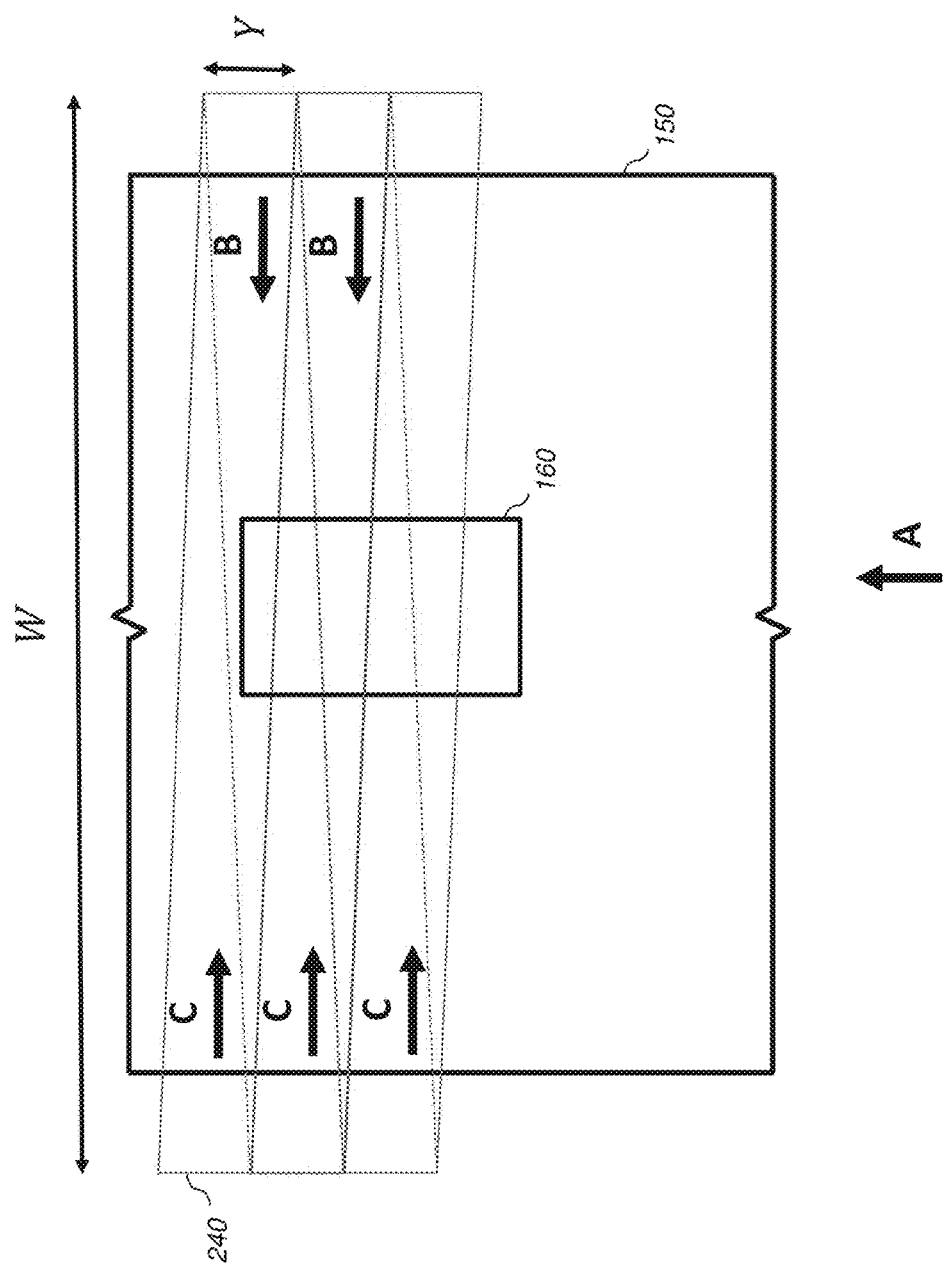
FIG. 5 is an illustration of the scanning paths of the laser system when moving only perpendicular to the transport path.

FIG. 5 illustrates movement of the laser module 200 during a scanning process in which the object moves in direction A and the laser module moves only in directions perpendicular to direction A. The laser module 200 is rotated 90 degrees such that the laser field of view 240 is parallel to direction A. As can be seen in the Figure, as the laser module moves in directions B and C, perpendicular to direction A, the field of view 240 of the laser cone scans a path across the transport 150. As part of a raster scanning process, the laser module alternatingly moves in directions B and C, crossing repeatedly over the object as it conducts the scans. Relative to the object 160 being inspected, the laser module thus creates an overlapping scan pattern with a slant, with the slant being imparted because the object being inspected continues to move in direction A as the scans are performed. Overlap scanning can be performed by either altering the velocity of the transport 150 or laser module 200. For complete coverage of the scanned part, the following relation must hold true:

$$2 \le \frac{V_B Y}{V_L W}$$

where Y is the length of the laser field of view 240, W is the distance the laser module 200 is scanning across the transport 150 as shown in FIG. 5, and V_B and V_L are the velocities of the transport 150 and laser module 200, respectively. When this relation holds true, the laser field of view 240 will overlap the object being inspected allowing multiple point cloud data points for the same spatial location to be captured. In addition, this allows for calibration of the system with respect to positional discontinuities such as those caused when the transport is not parallel to laser module.

The angular relationship between laser field of view and the transport may also be considered. If the angular relationship is not zero degrees, meaning they are not parallel, one end of laser field of view will be closer to the transport than the other end. Since the object being scanned is moving in direction A as shown in FIG. 3A, any point on the surface of the object will appear to increase or decrease in Z direction or height based on the angular relationship of the laser field of view with respect to the transport. As laser module traverses in directions B and C as shown in FIG. 5, each laser traversal over the object will create a stair step in the scanned data in Z direction as the object travels through this laser field of view angular relationship in direction A. This angular relationship can be compensated for by performing a calibration. In this calibration, a scan of the transport is performed without any object present. Any difference in height between the two end points of the laser field of view is known to be due to the angular relationship. The angular relationship may be stored in system memory, allowing the system processing unit to subtract out any stair step in the scanned data.

Similarly, the angular relationship direction A of the object must be zero degrees with respect to the laser field of view. In this case, any point on the surface of the object will appear to move in either directions B or C based on the angular relationship of the laser field of view with respect to the transport direction A. In this calibration, a scan of a calibration target is used to determine the angular relationship. Any stair stepping difference along the edge between two laser module traversals is known to be due to the angular relationship. The angular relationship may be stored in system memory allowing the system processing unit to subtract out any stair step in the scanned data.

The distance W that the laser module is scanning across the transport may be the width of the transport 150 when scanning the entire transport, or W could be a region of the transport if the position of the object on the belt is known. By setting W to correspond to only a region of the transport when the position of the object is known, higher scanning throughput at the same resolution, or the same throughput at a higher resolution, may be achieved.

By performing this overlapping scanning process, objects larger than the laser field of view 240 may be scanned, and the noise is also reduced. This configuration allows the capture of higher resolution images based on the distance between motor steps and acquisition rate when traversing the laser over a larger area, and not limited to the native resolution of the profilometer itself.

As noted above, performing the overlapping scans helps to reduce noise. Noise is introduced by inherent measurement error and mechanical noise due to the object and laser module 200 moving in the inspection process. By performing scanning so that there is an overlap of the scanning of segments of the inspected object, multiple point cloud data points for the same spatial location on the object are created. This multiplicity of point cloud points for a single spatial location allows for the calculation of a mean and variance (or confidence interval) for that spatial coordinate. By scanning portions of the inspected part several times and averaging the data, overall noise in the system is not only reduced, but remaining noise can be accurately calculated and reported.

Figure 6:
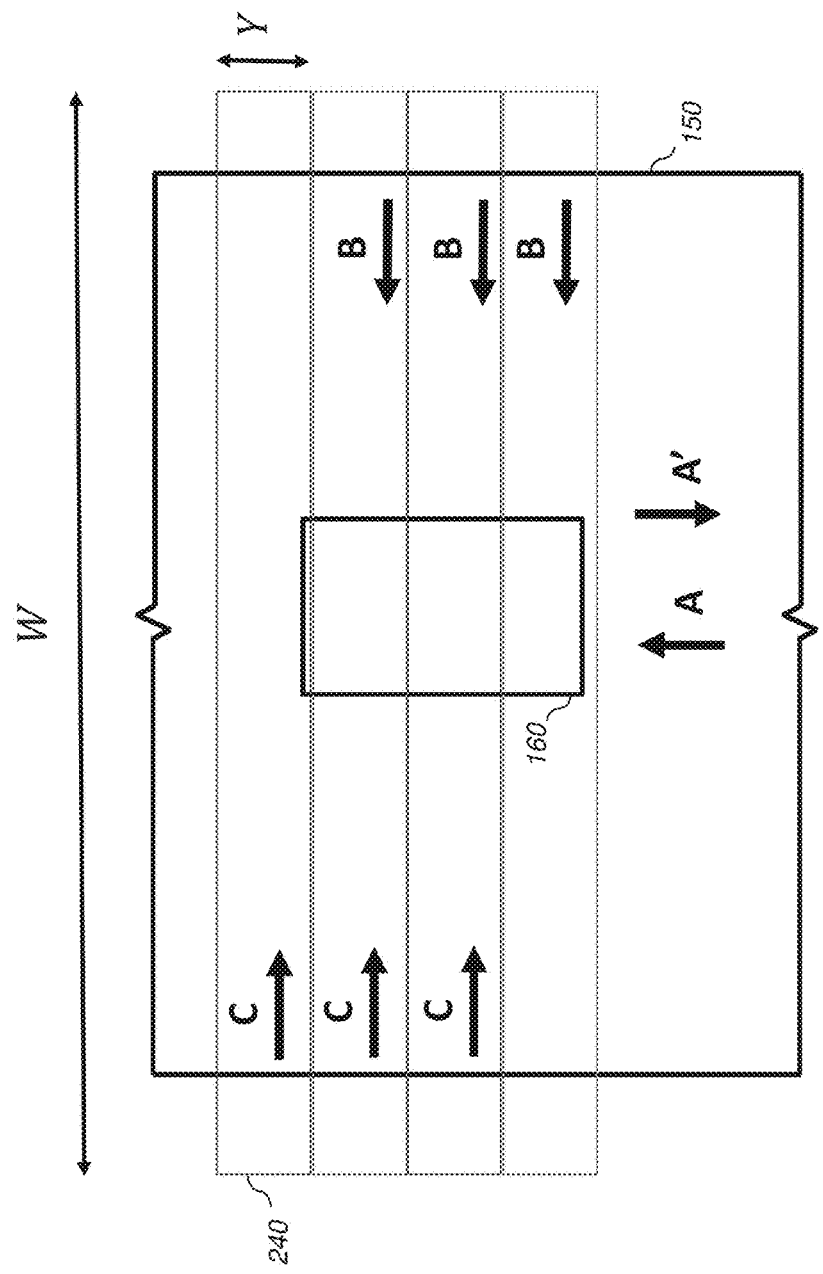
FIG. 6 is an illustration of the scanning paths of the laser system when the laser system moves both perpendicular to and in the same direction as the transport path.

FIG. 6 illustrates a scanning process in which the laser module 200 moves in the same direction as the object 160 along the transport path 150, as well perpendicular to the transport path. By moving in the same direction as the object, and at the same speed as the object in that direction, no slant is introduced in the scans. For example, as shown in FIG. 6, laser module 200 may move in direction C perpendicular to the direction of motion A of the object 160 along the transport 150, with the laser field of view 240 scanning a path across the transport 150 in a raster scanning process. Unlike in FIG. 5 where the laser module 200 only moved in directions B and C perpendicular to direction A, in the process shown in FIG. 6 the laser module 200 also moves in direction A at the same speed as the object as it conducts the scan. When the laser module reaches the end of a scan, it then moves a distance A' that is equal to the length of the field of view 240 of the laser. Then, the laser module 200 reverses direction and moves in direction B while at the same time moving in direction A at the same speed as the object 160. Thus, relative to the object 160, the laser module 200 makes a scan of the entire object once, as shown in FIG. 6.

Figure 7:
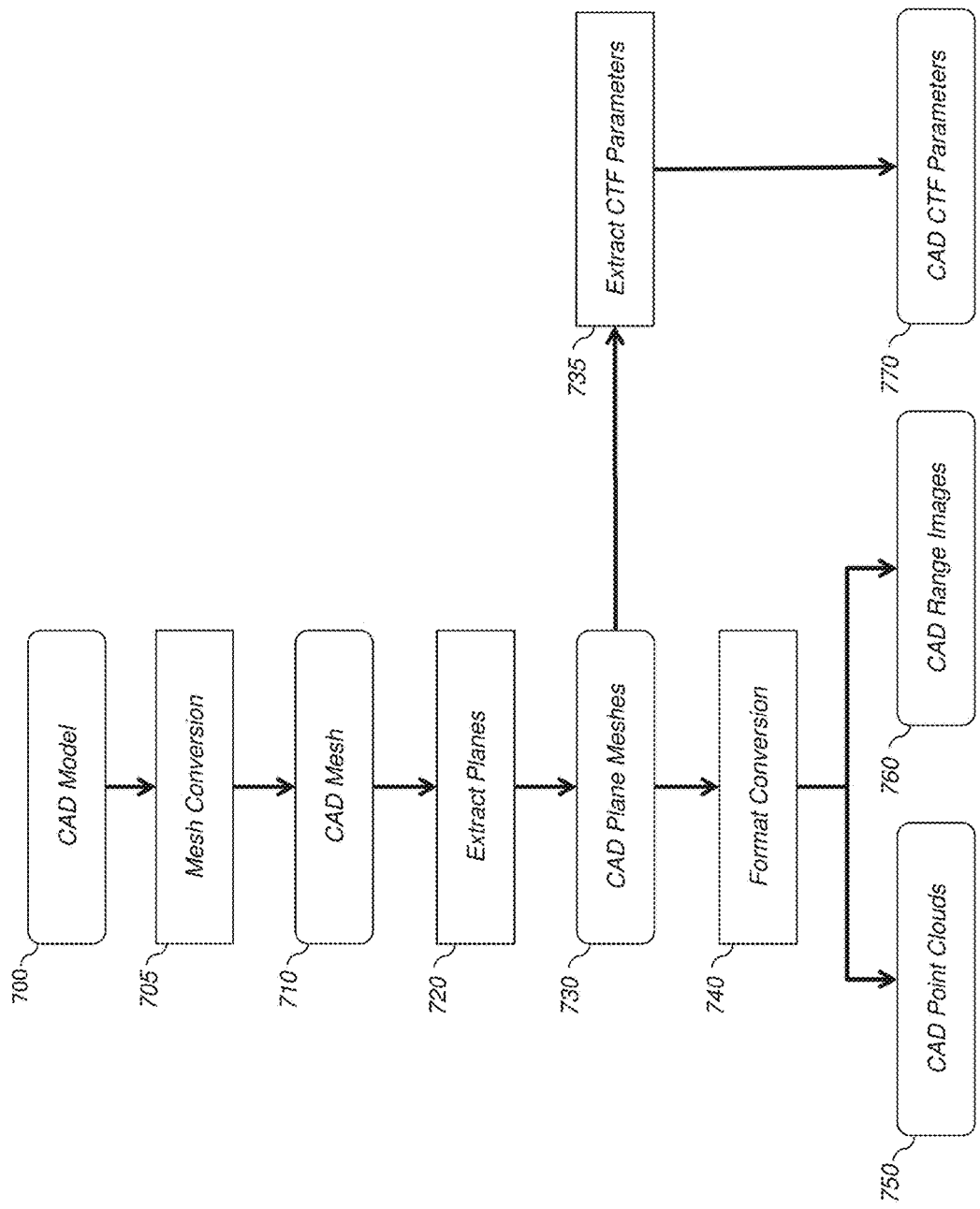
FIG. 7 depicts the details of the processing of converting stored CAD models of an object into a point cloud for comparison to the point cloud from the laser system.

FIG. 7 is flow diagram illustrating the processing performed to convert the CAD models into a format useable for interfacing with a corrected 3-D point cloud data obtained from the laser module 200 scans of an inspected object. The CAD models can be dgn, dwg, dxf, or stl file formats, or other formats that allow generation of a CAD file. This process may be performed in real time as the objects are being inspected, or can be performed prior to initiating a quality inspection on objects. When performed prior to initiating an inspection, CAD models of the objects anticipated to be inspected may be retrieved and processed, with the results being stored in CAD model database 425. As shown in FIG. 7, a CAD model 700 is loaded into the system, and mesh conversion step 705 is performed on the CAD model, resulting in a CAD mesh 710. Then, extract planes step 720 is performed on the CAD mesh 710 resulting in CAD plane meshes 730. The CAD plane meshes 730 represent a plane or view of the object from a predefined point of view. These planes or views may be manually generated in advance by editing the CAD model using CAD editing software such as MeshLab and are available to the extract planes 720 step. In an alternative embodiment, the planes or views can be automatically identified based on the natural rest positions of the object in reference to the orientation of the transport. The orientation of transport may be obtained by over scanning the object to capture the transport in the scan. Once defined, these planes can automatically be generated. The critical to function (CTF) parameters for the CAD plane meshes 730 may then be extracted by the extract CTF parameter step 735. These CTF parameters are user defined dimensions that need to be measured and verified. These parameters can be manually identified by an operator, or can be determined automatically by system processing. For example, many times a soft- or hardcopy drawing of the object is provided with tolerance and CTF data included, which can be extracted using document processing or OCR software. Based on the extract CTF parameter step 735, CAD CTF parameters 770 are generated and stored in the CAD model database 425. The CAD plane meshes 730 also undergo format conversion step 740 to generate CAD point clouds 750 and CAD range images 760 which can also be stored in the CAD model database 425. CAD range images 760 represents the six faces of the object being inspected.

Figure 8:
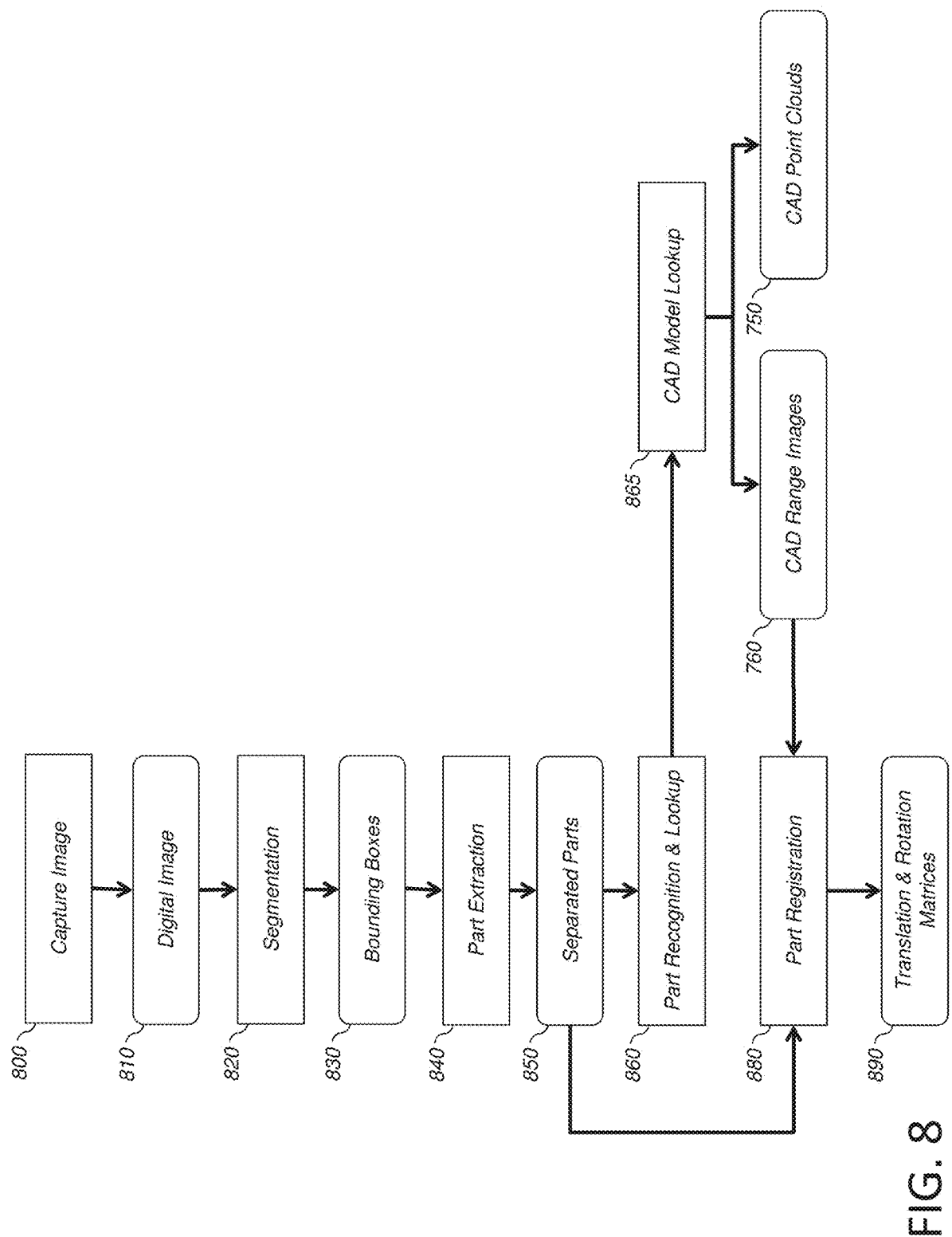
FIG. 8 depicts the details of the processing of image data from the optical acquisition unit to identify the objects being inspected.

FIG. 8 is a flow diagram illustrating the processing performed on image data from the optical acquisition unit 110. This processing includes identifying the objects on the transport 150 being inspected, as well as the position and orientation of the object 160 on the transport 150. As shown, the optical acquisition unit 110 performs an image capture 800 of the object 160, producing at least one digital image 810 of that object. The digital image 810 then undergoes a segmentation process step 820, and bounding boxes 830 are generated that can be applied to the digital image 810 to locate areas of interest that may be an object or feature of an object being inspected. These bounding boxes 830 may be used as input to system processing unit 170 to determine the scanning area of laser module 200. In part extraction step 840, separated parts 850 within the digital image 810 defined by the bounding boxes are extracted. A part recognition and lookup process 860 is then performed on each separated part 850 from the digital image 810. As part of this process to recognize the objects, a pattern matching process is performed in which the system performs a CAD model lookup 865 to compare the objects located in the CAD model database 425 to separated parts 850. The bounding boxes 830 may include different objects being inspected that require different CAD models to be referenced. The pattern matching processing may be any commonly known pattern matching algorithm. When a match is found in the CAD model database 425, the pertinent CAD point cloud 750 is identified for later processing. Further, the CAD range image 760 is identified and then used in the part registration step 880 to identify the translation & orientation matrices 890, which are used to rotate the CAD data to match the orientation of the point clouds obtained from the laser module 200 scans of the object 160, as explained below. In an alternative embodiment, the surface dimensions of the objects 160 in the digital images 810 may be determined, and used as an alternative to the pattern matching used in the part recognition and lookup process 860.

Figure 9A:
FIG. 9A depicts the processing to merge data from the laser system with CAD model information to determine differences between actual object dimensions and expected object dimensions.

FIG. 9A illustrates the process to merge data from the laser module scans with the information obtained from the CAD model information for the object being scanned. This process determines differences between the actual object dimensions obtained from the laser scans, and the expected object dimensions based on the CAD model tolerances. As shown in FIG. 9A, raw, unstructured point cloud data 900 is obtained from laser module scans of the object 160, as described above with respect to FIGS. 5 and 6. Due to the continuous traversing of the part, while the laser module scans orthogonally, line profile data sets (raw point cloud data acquired by a single laser field of view 240 line from the laser driver 210) will be offset from one another by a distance equivalent to v*Δt, v being the traversing velocity of the object, and Δt is the time interval between the a line scan of an object and the next line scan. Alternatively, the timer unit 480 generates a trigger signal to the laser module 200 to capture a line profile. Timer unit 480 also generates a trigger to machine controller 430 to capture positional data of the transport and laser module. Using the trigger signal allows the system to read positional data from, for example, an encoder, as opposed to calculating the position based on velocity. In both cases, a rephasing of the raw point cloud data 910 is implemented to align and average these multiple point clouds together in a single rephased object point cloud 920. To acquire an accurate point cloud representation of the object, the raw point cloud data is rephased by translating all points in the point cloud by an amount equivalent to −v*Δt. Alternatively, Δt can be taken to be the total time elapsed from a set time, for example the time at which the machine was engaged, to the current line scans timestamp.

The object being inspected is then registered to the CAD model 930 for that particular object. As part of this registration process, the CAD point cloud 750 is retrieved, as well as the translation and rotational matrices 890. The rephased object point cloud is also registered at 940 to the CAD model, resulting in a point cloud aligned to the CAD model. That is, the obtained rephased point cloud is overlaid on the CAD model information for the particular object. The differences between the CAD model point cloud 875, which comprises structured data, and the registered point cloud 940 are then calculation at step 950. Subtractive matching may have been conducted to register the CAD model to the point cloud data as closely as possible. This matching finds a minimum total variance between the CAD model and the point cloud to determine the optimal overlay between the two. In calculating the differences 950, for each point on the CAD model that has an associated rephased point cloud point, a D value is calculated representing the absolute difference between these two points' spatial coordinates. This D value will be calculated as the magnitude of the vectors of the two points.

$$D = \sqrt{((|x\_1 - x\_2|)^{\wedge}2 + (|y\_1 - y\_2|)^{\wedge}2 + (|z\_1 + z\_2|)^{\wedge}2)}$$

where x, y, and z represent the spatial coordinates of the CAD and point cloud data.

This same D value is used in the CAD model registration process mentioned above, with the CAD model being registered to the point cloud data based on the orientation where the variance of D values is at its minimum.

After the differences are calculated, in the form of the D values for each point, a set of point cloud differences 960 is obtained. A heat map creation process 970 is then implemented to generate a heat map 980 showing areas of high deviation between the CAD model and the obtained point cloud from the object scans. The heat map may be used by an operator to determine if the deviations between the dimensions of the actual object being inspected, and the expected dimensions of that object from the CAD model database are outside of predetermined tolerance levels set in the extract CTF parameters 735. If the heat map 980 shows areas outside the tolerance levels, the part may be identified as defective. The heat map may be user configurable, with the user setting predetermined limits for when a deviation will be considered relevant enough to indicate on the heat map.

Figure 9B:
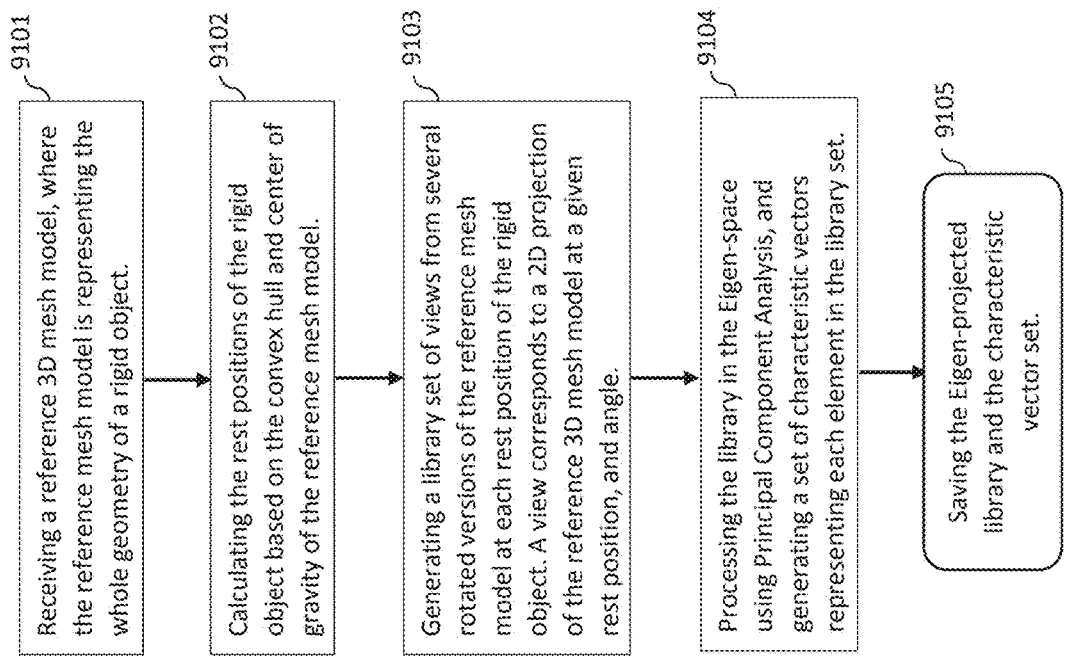
FIG. 9B depicts a system flow diagram for library generation of an object based on its reference mesh model.
Figure 9C:
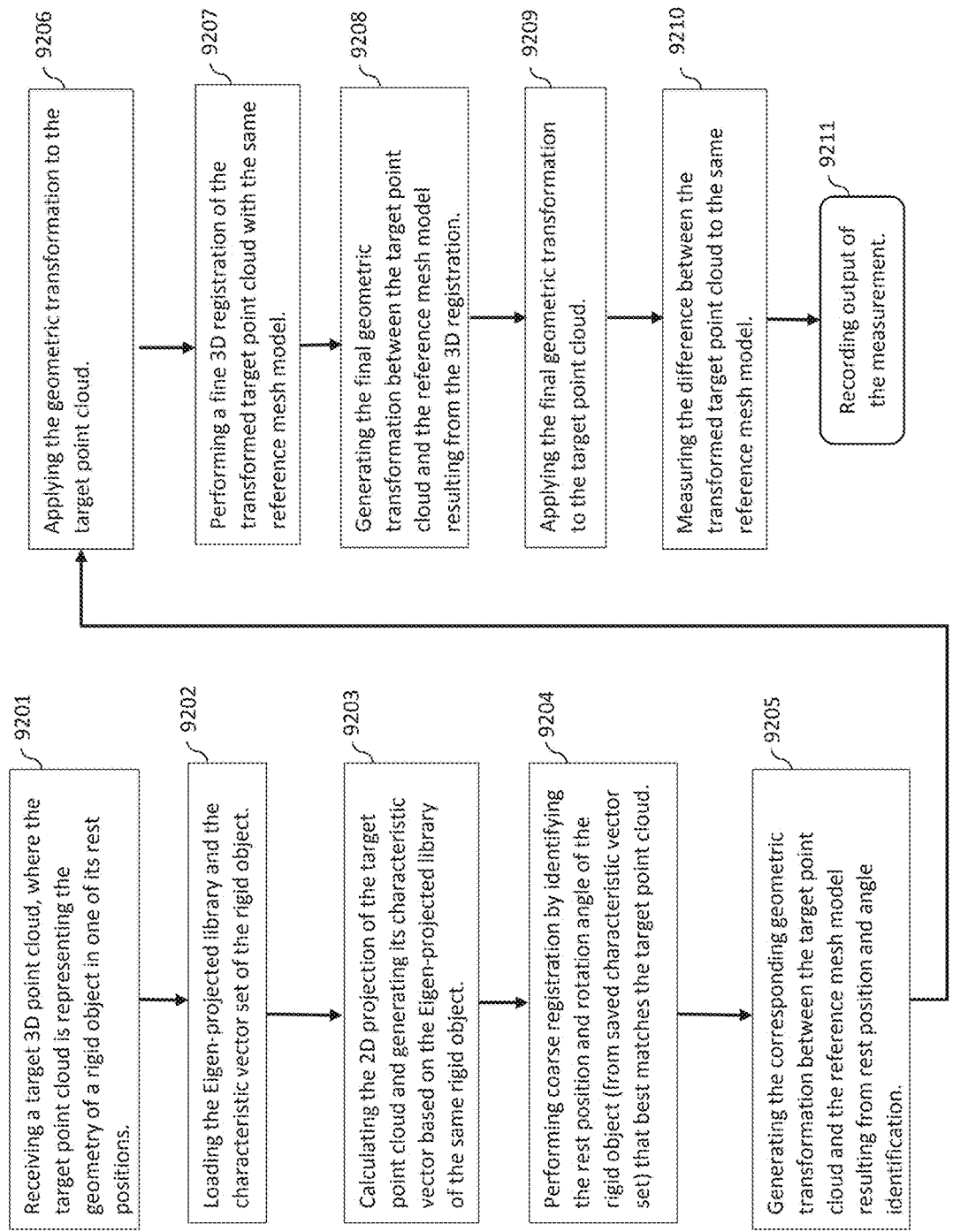
FIG. 9C depicts a system flow diagram for registering and matching a target point cloud to a reference mesh model.

FIGS. 9B and 9C illustrate details of the registration process 930 from FIG. 9A. The overall registration process is divided in two stages: 1) library generation, and 2) point clouds registration. FIG. 9B depicts the library generation steps to create a set of characteristic vectors (or weights) for use in the next stage. As shown, the system receives a reference 3D mesh model 9101 representing the whole geometry of a rigid object. Then, the various rest positions of the rigid object are calculated based on the convex hull and center of gravity of the reference mesh model 9102. The rest positions of a rigid object are position where the object is stable on a horizontal plane. For each of these rest positions of the rigid object, a library of views from a number of rotated versions (e.g., 360 at 1-degree increment) of the reference mesh model is generated 9103. Specifically, a view corresponds to a 2D projection of the reference 3D mesh model at a given rest position and a specific angle. Note that down-sampling may be applied during the 2D projection process to reduce computational cost. The library of views is then processed in the Eigen-space using a Principle Component Analysis to generate a set of characteristic vectors (or weights) for each element in the library set 9104. Finally, the system saves both the Eigen-projected library (or projection matrix) and the characteristic vector set 9105. If more than one rigid object is considered in the system, the steps 9101 to 9105 can be repeated to generate the final library (or projection matrix) and characteristic vector set. These saved library and characteristic vector set will be used in the next stage for 2D and 3D point cloud registrations as described in FIG. 9C.

FIG. 9C depicts the process of 2D and 3D registration and matching of point clouds. As shown, the system receives a target 3D point cloud 9201, which may be the rephased part point cloud. This target point cloud represents the geometry of a rigid object in one of its rest positions. The corresponding rigid object could be one of the rigid objects considered in the previous library generation stage. Next, the saved Eigen-projected library (or projection matrix) and the characteristic vector set are loaded 9202. Then, in step 9203, the 2D projection of the target point cloud is calculated to generate its characteristic vector (weights) based on the Eigen-projected library generated from the previous stage. Again note that down-sampling may be applied during the 2D projection process to reduce computational cost. The Eigen-projected library is assumed to be generated using the same rigid object. In step 9204, a coarse registration is performed by identifying the rest position and rotation angle of the rigid object that best matches the target point cloud. This is achieved by finding the best match or closest distance between the characteristic vector from the target point cloud and the saved characteristic vector set of the rigid object(s)

with the corresponding reference mesh model(s) from the previous stage. A metric, such as the least mean squares error or other error metrics, can be used to compute the distance (or matching error) between the characteristic vectors.

Then an initial corresponding geometric transformation between the target point cloud and the reference mesh model resulting from the rest position and angle identification step is generated 9205. The rigid 2D geometric transformation includes information such as translational and rotational matrices. Next, the geometric transformation obtained is applied to the target point cloud 9206. The output of this step is a translated and rotated target point cloud that will be coarsely aligned with the identified reference mesh model (and the associated rigid object).

This is followed by a fine 3D registration step 9207 that completes the whole registration process. The fine 3D registration 9207 may use algorithms such as the Iterative Closest Point (ICP), which is a popular algorithm due to its simplicity. The inputs of the algorithm are the target and reference point clouds, initial estimation of the geometric transformation (from step 9205) to align the target to the reference, and criteria for stopping the iterations. The output of the algorithm is a refined geometric transformation matrix. The algorithm is:

1. For each point (from the whole set of vertices usually referred to as dense or a selection of pairs of vertices from each model) in the target point cloud, matching the closest point in the reference point cloud (or a selected set).
2. Estimating the combination of rotation and translation using a root mean square point to point distance metric minimization technique, which best aligns each target point to its match found in the previous step. In addition, the points may be weighted and outliers may be rejected prior to alignment.
3. Transforming the target points using the obtained transformation.
4. Iterating (re-associating the points, and so on).

Then, the final geometric transform between the target point cloud and the reference mesh model is determined 9208 based on the refined geometric transformation matrix obtained in the above fine 3D registration step. Note that in general a geometric transform is an affine transform consisting of one or a combination of translation, scale, shear, or rotation transformations.

The final geometric transformation is then applied 9209 to the target point cloud to obtain a final alignment or registration with the reference mesh model. Finally, the difference between the transformed target point cloud and the same reference 3D mesh is measured 9210. The matching result is recorded online or passed to the next step of the inspection system 9211.

Figure 10:
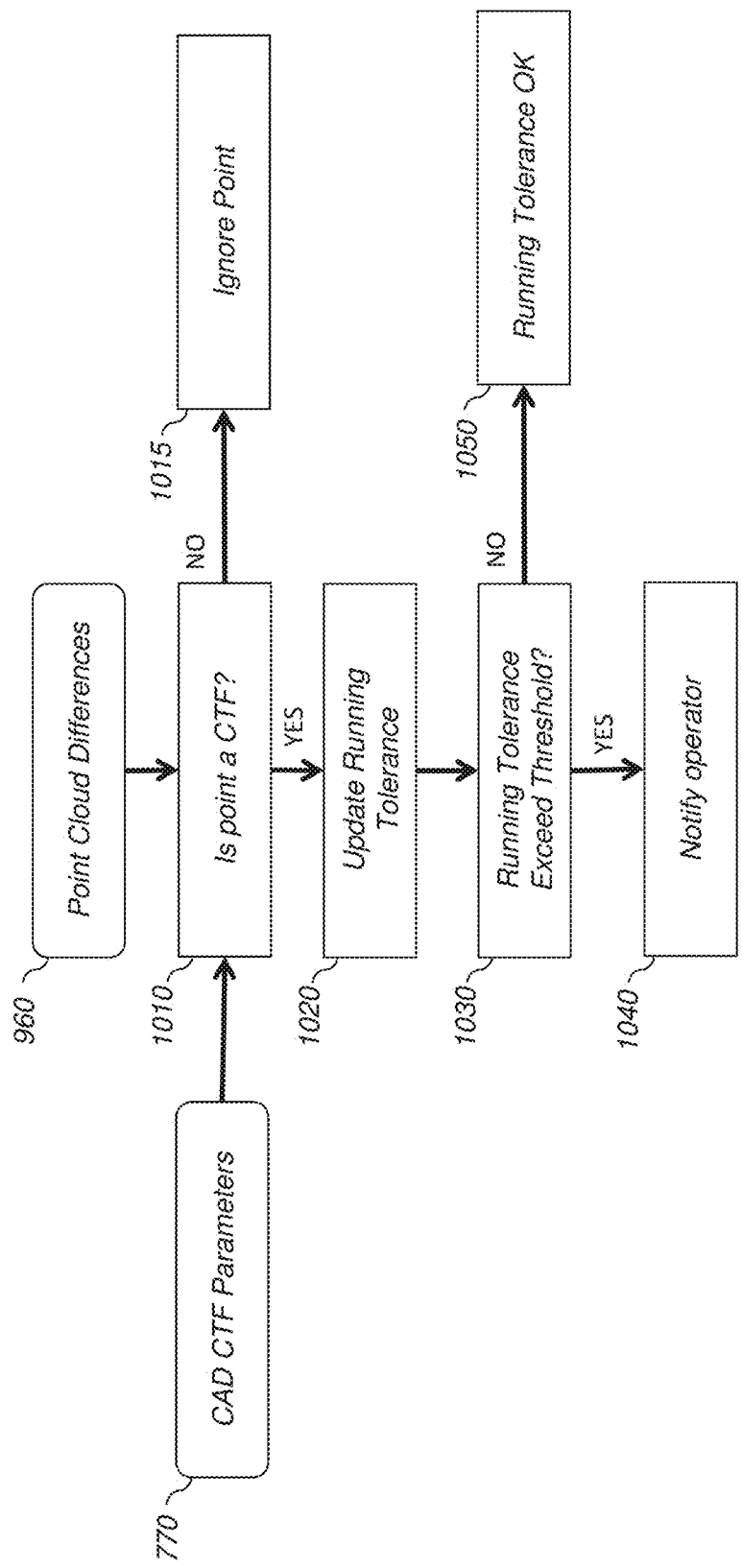
FIG. 10 depicts the processing of the tolerance determinations made by the system and method.

FIG. 10 provides an illustration of how the quality inspection system checks for defects in the objects being inspected. For example, the system may automatically check tolerances to the defined CTF specifications and will notify an operator if system tolerances are being exceeded during the inspection of an object. For example, when manufactured parts coming from a mold are being inspected, the mold will wear over time. As the mold wears, the parts coming from the mold will have dimensions altered from the expected dimensions in proportion to the amount of wear on the mold. When a mold becomes overly worn, the parts produced will no longer be within the tolerance range for their proper and intended use. As shown in FIG. 10, the point cloud differences 960 calculated for each point in FIG. 9A, along with the CAD CTF parameters 770 are also retrieved, and are used to determine whether each point in the registered point cloud is a CTF in step 1010. If a point is not a CTF point, then the point is ignored at 1015. However, if the point is a CTF, then an update to the running tolerance is performed at 1020. A check is then made to determine if the running tolerance exceeds a predetermined threshold at 1030. If the threshold is not exceeded as defined by the extract CTF parameters 735, then the running tolerance is determined to be within acceptable limits at 1050. However, if the running tolerance exceeds the predetermined threshold, the system issues a notification 1040 to the operator. In another embodiment, the defective object may automatically be removed from the transport 150 using any commonly known removal method in the industry.

Defects specific to manufacturing of parts by injection molding may include flow lines, burn marks, sink marks, jetting, delamination, short shot, flashing or other defects known to those experienced in the art. In an alternative embodiment, CAD CTF Parameters 770 may include surface defects or optical characteristics such as, but not limited to, color, texture or finish in order to identify contamination such as dust, oil, or other foreign objects present in the separated parts 850 within the digital image 810 captured by the image acquisition unit 110. In this embodiment, step 1010 would determine if the optical characteristics exceeds the specified optical CAD CTF Parameters.

Figure 11:
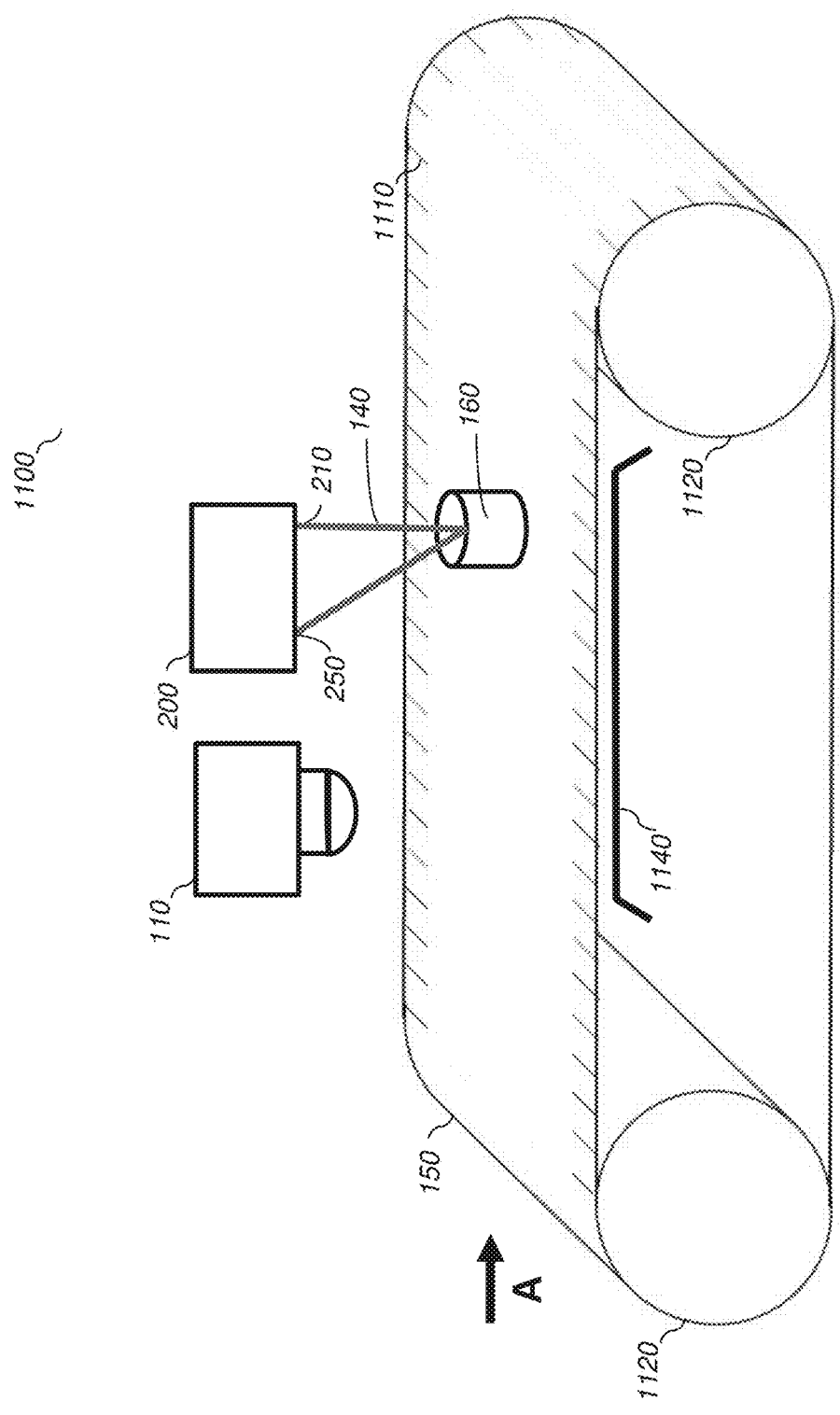
FIG. 11 depicts an example of a transport system that may be used in the inspection system to move objects being inspected past the optical acquisition unit and the laser scanning system.

FIG. 11 provides an example of the inspection system, using a conveyor belt as the transport 150. The conveyer belt may be placed around rollers 1120 that move the conveyer belt as they turn in the direction shown by A. The rollers may be driven by a transport motor control 485. As shown, the optical acquisition unit 110 is located at a first position along the transport 150, and the laser module 200, including the laser driver 210, laser sensor 250, and laser cone 230, is located further downstream on the inspection path. The object 160 being inspected is moved by the conveyer belt so that it passes under the optical acquisition unit 110 and the laser module 200. Optionally, a belt tensioner 1140 may be provided beneath the moving conveyor belt to provide a solid surface for inspection, and to remove any vibrational motion in the conveyor belt. The reduced vibration motion lessens the noise in the obtained optical images and laser scans of the inspected objects. As shown in FIG. 11, the conveyer belt may be marked to allow for automated calibration of optical acquisition unit 110 or laser module 200. Beveled markings along one side or on both sides of the transport, such as tick marks 1110, are used for calibration and location identification on the transport. In addition to the tick marks, other markings may be included to assist in identification of the objects being inspected or the position of the objects along the transport. These references can include numbering, differently shaped ticks, or other identifying marks. As an example, a single reference tick on either side of the transport may be used. This tick mark will be elongated with relation to the other uniform ticks for easy identification. The system may perform a modulation transfer function (MTF) of the tick marks, and optical acquisition unit 110 can additionally be calibrated for sharpness, blooming, focus, and depth of field using the tick marks as a reference. Due to the uniformity of the tick marks, position, depth of field, and resolution can be calibrated for both optical acquisition unit 110 and laser module 200, along with identification of image and point cloud distortion due to non-perpendicularity of tools. From this data, distortion can be calculated and corrected for. The tick marks can also control for velocity flutter by identifying any changes in velocity not recorded by the transport motor control 465.

This information can be used to correct the rephasing point cloud data 910 by adding a phase shift.

Figure 12:
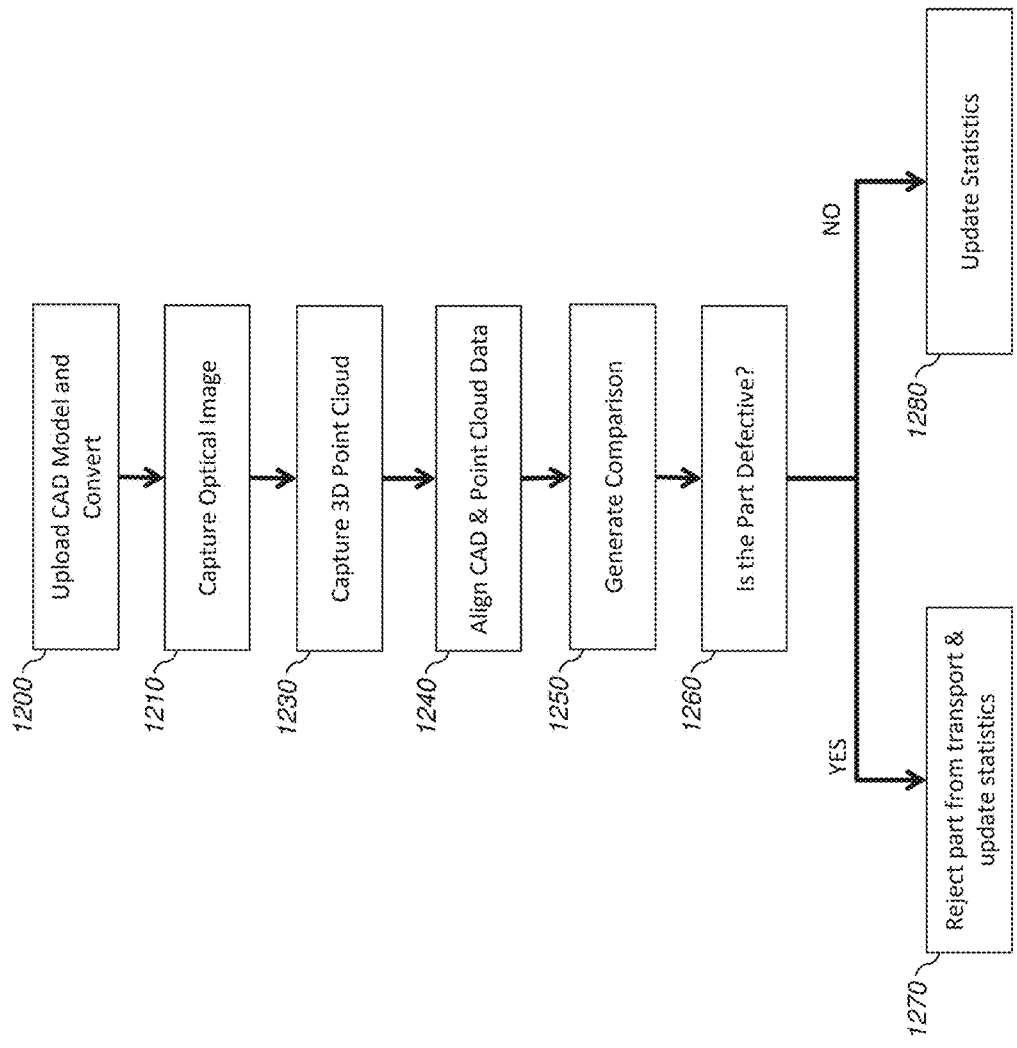
FIG. 12 depicts the processing of determining whether an object being inspected is defective.

FIG. 12 provides a flow diagram detailing an overview of the process to determine if an object being inspected is defective. As shown, a CAD model of the object is uploaded and converted at 1200, resulting in a CAD model mesh point cloud. As the object 160 moves down the transport 150 in the inspection system 100 and into the optical acquisition unit 110, an optical image is captured at 1210. Then, the object 160 moves further along the transport 150 and passes under the laser acquisition modules 200 which perform laser scans. The laser scans result in the capture of a 3-D point cloud of the object at 1230. The 3-D point cloud of the object is aligned with the CAD model point cloud at step 1140, and a comparison between the two is then performed at 1250. Differences in points are determined, and a determination is made if the object 160 being inspected is defective at 1260. If the object 160 is defective, the object may be rejected from the transport and statistics regarding defective objects may be updated at 1270. If the object is not defective, then the statistics are updated to count another acceptable product passing the inspection process at 1280. Statistics may include environmental characteristics such as temperature and humidity as well as running tolerances against critical to function parameters. The statistical information can be related back the mold or the specific cavity based on the number formed on the object or other unique characteristics. This statistical information can be used to schedule preventative maintenance for both the machine and mold.

Figure 13:
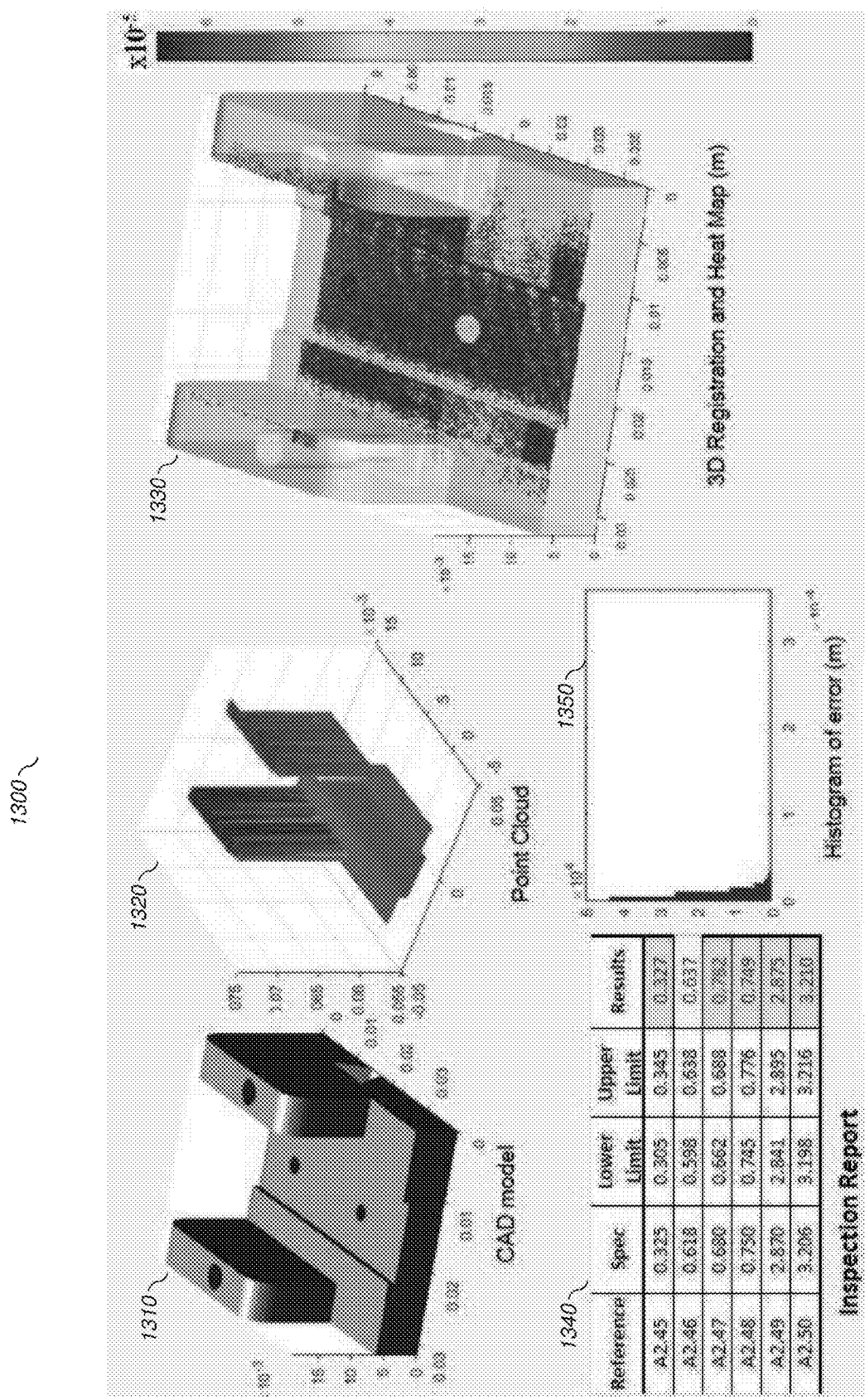
FIG. 13 depicts a sample user interface that may be displayed to the operator.

FIG. 13 provides a sample user interface that may be displayed to the operator. A user interface 1300 may be displayed to the operator on the operator display 128 or remotely through the network interface 445. The user interface 1300 may update real-time as the objects 160 are inspected or the operator may review the historical data for objects inspected or statistical trends. The user interface 1300 may organize the objects inspected to show only the objects exceeding or close to exceed tolerances so operator can focus on problem areas.

The user interface 1300 may include a display of the CAD model 1310, a point cloud 1320 from the laser model 200, as well as the histogram of error 1350 and 3D heat map of errors 1330. An operator can select the CAD model 1310 to open the CAD Model database 425 to display, add, or edit the CTF parameters as used by extract CTF parameters 735. The point cloud 1320 may be the raw part point cloud 900 or the registered point cloud 940 as defined by the operator preferences. The operator may also define if data from one or multiple planes scans are displayed in the 3D heat map of errors 1330. An inspection report 1340 may also be displayed. The inspection report 1340 may include the critical to function parameters with ranges and the actual measured values. The results may be color coded to enable the operator to quickly identify measurements that exceed tolerances. For example, red may be used to indicate a measurement exceeded its tolerance while yellow may indicate near the tolerance. The user interface 1300 may also allow the operator to edit critical to function parameter limits thereby changing what is or is not acceptable. The inspection report 1340 may also include a drawing of the object with the measured dimensions for the object shown directly thereon. Overlaying the measured dimensions with the drawing displays the measured results in a format similar to the original drawing specification. The user interface 1300 may also include history trends for the critical to function parameters and statistical process control information across multiple batches or shifts. Using the trends and statistical process control, the mold wear over time can be identified and tracked. The data could be used to correlate changes in incoming material or process changes such as temperature or pressure. The operator can take the appropriate action to fix or replace molds that are producing objects that exceed tolerances. In cases where the mold has multiple cavities, the objects from specific cavities may be identified and tracked across multiple batches or shifts.

In injection molding, operators need the ability to qualify a new mold or evaluate the wear on existing molds. The baseline CAD model of the mold can be loaded and a color heat-map overlay of the errors for an object or a batch of objects can be overlaid with the mold to indicate where on the mold tolerances are being exceeded. This will characterize and track the mold from its initial installation to the time the mold needs to be repaired or replaced. A display of the heat maps over time may be provided to the operator to show the operator the wear of the mold over time.

Each mold may contain one or more cavities that produce objects. In building a mold, each cavity will be produced based on a CAD model. In designing the mold, each cavity will have unique deviations from the CAD model. Each cavity can be characterized when the mold is made to produce a cavity CAD mesh unique to each cavity. Using the cavity number, or by using the cavity unique deviations, as the cavities signature, an operator is able to identify which cavity made the defective object. This will characterize and track each cavity from its initial installation to the time the cavity needs to be repaired. This could be displayed to show the operator the wear of each cavity over time.

A general summary of the system and process is described in the following. An operator using the inspection system first loads CAD models for the objects to inspect into the inspection system. The CAD models may already be included in a CAD model database, as explained above, or may be loaded by the operator into the CAD model database by the operator prior to beginning the inspection process. The objects to be inspected are then placed on the transport, either manually by an operator or automatically, and the transport motors control drives the transport so that objects are moved into the system at a known velocity. When an object moves into optical acquisition system, optical acquisition system captures at least one image of the object. The at least one image is sent to a system processing unit, such as described above with respect to FIG. 4. The system processing unit analyzes the images and determines an outline of the surface of the object. The system processing unit performs pattern matching techniques between the determined outline of the surface of the object and the CAD range images from the CAD model database. Based on the pattern matching results, a corresponding CAD model is selected from the database for comparison to the object being inspected. The system processing unit further uses the captured images to determine the position and orientation of the object on the transport.

When object moves along the transport within the laser field of view, the system processing unit instructs the laser module where to collect data along the transport. The laser module traverses perpendicularly to the transport direction, back and forth over a predefined area as objects are moved along the transport, such that the laser module field of view passes over the object one or more times. Reflected laser light is received at a laser sensor, and the received laser light is used to generate a 3-D point cloud of the scanned object. This raw part point cloud of the scanned object is sent to the system processing unit, which performs corrections to the point cloud based on the velocity at which the object was moving along the transport as well as the velocity and direction of the laser module as the scans were performed. As noted earlier, the corrections to the point cloud could also be performed by using the positional data. This corrected 3-D point cloud of the object is then prepared for analyzing.

The system processing unit retrieves the CAD point cloud that was determined to match the part outline from a part recognition & lookup process. The CAD point cloud is rotated so that it matches the determined coordinate geometry of the object. The corrected 3-D point cloud from the laser scans of the object is then interpolated to a predetermined geometric grid for comparison to the CAD model. Through subtractive reasoning, the interpolated corrected 3-D point cloud and CAD model are paired and a series of D values are calculated for, and associated with, each point in the point cloud. The D values are the subtractive difference between the relative positions of the CAD model corresponding to the inspected object and corrected 3-D point cloud data of the object 160. The D values may correspond to a set color, based on user preference. For example, a user may select red for D values outside a predetermined tolerance allowance, and green for values within the tolerance. The predetermined tolerance is based on how much deviation between the CAD model for the object and the point cloud of the scanned object is allowed. The CAD model with the color overlay will be generated and saved in a report, and a smoothing process may be applied so that the colors look uniform in the final overlay in the heat map. The smoothing of D value parameters can be performed by averaging or other means, in order to obtain a smooth gradation between color-coded segments of the visual representation of the point cloud data. The visual representation of the point cloud data may be presented as a set of color-coded point cloud data points, a set of color-coded point cloud data points layered atop an image of registered CAD model, or a color-coded polygon mesh created by forming polygon surfaces between the point cloud data points. When presented as a color-coded polygon mesh, polygon surfaces are color-coded according to their assigned D value, being the average of D values for the points that the polygon surface connects.

If D values exceed a certain threshold as defined by CAD CTF parameters, the transport stops, or the object being inspected will be removed from the inspection line, and color overlaid heat map for that particular object may be shown on the operator control panel or saved to a failure report. Based on operator or customer specifications, if D values enter a certain threshold region, the system sends out an alert to notify operator. The alert may be an audible or visual alert presented at the operator control panel. Alerts may be color coded to impart urgency, based on user preferences. When the alerts are audible alerts, different tones, sounds, or volume may be used to signify the urgency. The alerts may also be a predefined or custom e-mail or text message sent over a network interface to predetermined recipients.

If D values do not exceed a certain threshold as defined by CAD CTF parameters, the transport and the object are allowed to continue. The color overlaid heat map for that particular object may be shown on the operator control panel or saved to an operator report.

The optical acquisition unit and laser module 200 inspect the plane or face of the object presented to the optical acquisition unit and laser module. However, the object may have CAD CTF parameters on the plane or face not presented to the optical acquisition unit and laser module. That is, one surface of the object will be contacting the transport, and thus will not be visible to the optical acquisition unit and laser module positioned above the transport. In order to image the bottom surface of the object that is in contact with the transport, and thus obtain a complete scan of all surfaces of the object, the system may include an additional laser module positioned under at least a top surface of the transport. The belt may be made of a transparent material, allowing the bottom laser module to scan the surface of the object through the transparent transport. In such a configuration, both the bottom and top laser modules would scan the object being inspected, capturing laser scans of all surfaces. The scans of the bottom surface are combined with the scans from the top laser module to form a combined point cloud representing all surfaces of the object. This combined point cloud is then compared to the CAD modules in the database, as described above. An additional optical acquisition unit may also be placed underneath the transport, to capture images of the surface in contact with the transport. Alternatively, the transport may comprise two separate belts, with a small gap in between. A laser module may be placed underneath the gap, with its field of view parallel to the length of the gap. As an object being inspected crosses over the gap from one transport belt to the other, the laser module positioned under the gap would capture scans of the bottom surface. Again, these scans of the bottom surface may be combined with the scans from the top laser modules to form a combined point cloud representing all surfaces of the object. As an alternative to using a transparent transport and positioning another laser module underneath the transport, the object being inspected may be flipped or rotated to expose a hidden plane of object as it moved along the transport. The object may be simply flipped or it may be automatically captured and rotated so that all planes of the object are presented to the optical acquisition unit or laser module for inspection.

In another embodiment, the objects to be inspected may be funneled to the optical acquisition unit which may identify the object to determine if the correct plane with the CAD CTF parameters was presented to optical acquisition unit. If the correct plane of object is presented, then it is allowed to continue along the transport. If the wrong side is presented, then the object is flipped over before be being inspected by the laser module. This has the advantages of getting all the objects in the same orientation and allows for a simpler flipping mechanism and reducing the area on the transport that needs to be scanned by the laser module. In some cases when the CAD model for the object is not available, a golden object that is known to be within specification may be available. In this embodiment, the golden object would be scanned with the optical acquisition unit and laser module to automatically generate and upload the CAD profiles for the object anticipated to be inspected, and where further updates may be perform in CAD model database. In this case, the operator would place the golden object on the transport and configure the system processing unit to store the CAD plane meshes and associated CAD point clouds, CAD range images into the CAD model database for future part recognition and lookup. The operator may add the required CAD CTF parameters to the CAD model database either through the operator control panel or network interface. In another embodiment, the inspection system may send an alert to the operator when it detects an object being scanned that it fails to identify in the part recognition and lookup process so that the operator could take the appropriate action.

In another embodiment, the golden object with known dimensions may be inspected to verify the calibration of the inspection system. In this example, the operator configures the inspection system for calibration and manually or automatically places the golden object on the transport to be scanned by the optical acquisition unit and laser module. In addition, by using a golden object for calibration, the working distance, focus, magnification and similar image parameters for the optical acquisition unit and laser module can be calibrated.

Polygonal scanners are commonly used in laser print engines, bar code scanners. Polygon scanners can be used for line-oriented scanning objects at fine resolutions. A spinning polygon mirror may be used to create a laser beam that performs high-speed linear scanning across the transport. The polygonal mirror may be rotated via a motor, and may be supported by a ball bearing or an air-bearing rotary spindle to produce smooth rotation to minimizes the distortions within laser beam. In addition, the laser sensor could be a linear array, CMOS, or similar technology known in the art.

The invention claimed is:

1. A system for automated, in-line inspection of objects comprising:
   a transport belt configured to move an object being inspected along a transport path;
   an optical acquisition unit configured to capture an image of the object being inspected and to transmit object image data;
   at least one laser module comprising a laser driver and at least one laser sensor configured to capture laser scans of the object being inspected by the at least one laser sensor and to generate point cloud data representing the object being inspected;
   a system memory including a computer-assisted design (CAD) model database containing CAD models; and
   a system processing unit configured to:
      analyze the object image data and select a CAD model from the CAD model database corresponding to the object being inspected;
      align the CAD model with the point cloud data; and
      compare the point cloud data to the CAD model by determining whether respective deviations between one or more point cloud dimensions of the point cloud data and one or more CAD dimensions of the CAD model exceed one or more thresholds.

2. The system of claim 1, wherein the system processing unit is further configured to determine whether the object being inspected is defective based on the comparison.

3. The system of claim 1, wherein the at least one laser module is a laser profilometer having a wavelength in a violet or ultraviolet range.

4. The system of claim 1, further comprising laser module guides restricting movement of the at least one laser module to predetermined directions with respect to the transport path.

5. The system of claim 1, wherein the at least one laser module includes a first laser module and a second laser module, the first laser module and the second laser module each including a respective laser driver, at least one respective laser sensor, and a microprocessor.

6. The system of claim 1, wherein the system processing unit is further configured to determine an angular relationship between a field of view of the at least one laser module and the transport path, and to perform a calibration based on determined differences in height between end points of the field of view due to the angular relationship.

7. A method for performing in-line inspection of objects comprising:
   positioning an object to be inspected on a transport belt;
   moving the object along a transport path using the transport belt;
   capturing an optical image of the object with an optical acquisition unit;
   capturing point cloud data representing the object with a laser module comprising a laser driver and at least one laser sensor;
   selecting a computer-assisted design (CAD) model matching the object being inspected based on the captured optical image in comparison to a database containing CAD models; and
   comparing the CAD model to the captured point cloud data by determining whether respective deviations between one or more point cloud dimensions of the captured point cloud data and one or more CAD dimensions of the CAD model exceed one or more thresholds.

* * * * *